US006138240A

United States Patent [19]
Tran et al.

[11] Patent Number: 6,138,240
[45] Date of Patent: Oct. 24, 2000

[54] SECURE GENERAL PURPOSE INPUT/OUTPUT PINS FOR PROTECTING COMPUTER SYSTEM RESOURCES

[75] Inventors: Robin T. Tran, Houston, Tex.; Christopher E. Simonich, Hillsboro, Oreg.

[73] Assignee: Compaq Computer Corporation, Houston, Tex.

[21] Appl. No.: 09/100,452

[22] Filed: Jun. 19, 1998

[51] Int. Cl.[7] .................................................. G06F 11/00
[52] U.S. Cl. ............................................ 713/202; 380/25
[58] Field of Search ................................... 713/202, 201, 713/200; 380/4, 23, 25, 26, 30, 49, 50; 711/164, 163

[56] References Cited

U.S. PATENT DOCUMENTS

| | | | |
|---|---|---|---|
| 3,890,601 | 6/1975 | Pietrolewicz | 340/172.5 |
| 4,685,056 | 8/1987 | Barnsdale, Jr. et al. | 364/200 |
| 4,942,606 | 7/1990 | Kaiser et al. | 380/4 |
| 4,959,860 | 9/1990 | Watters et al. | 380/4 |
| 5,022,077 | 6/1991 | Bealkowski et al. | 380/4 |
| 5,128,995 | 7/1992 | Arnold et al. | 380/4 |
| 5,173,940 | 12/1992 | Lantz et al. | 380/25 |
| 5,325,430 | 6/1994 | Smyth et al. | 380/4 |
| 5,365,587 | 11/1994 | Campbell et al. | 380/25 |
| 5,375,243 | 12/1994 | Parzych et al. | 395/725 |
| 5,377,269 | 12/1994 | Heptig et al. | 380/25 |
| 5,377,343 | 12/1994 | Yaezawa | 395/425 |
| 5,388,156 | 2/1995 | Blackledge, Jr. et al. | 380/4 |

(List continued on next page.)

FOREIGN PATENT DOCUMENTS 2154344  9/1985  United Kingdom ............ G06F 12/14

OTHER PUBLICATIONS

National Semiconductor™, *PC87308VUL SuperI/O Enhanced Sidewinder Lite Plug and Play Compatible Chip, with a Floppy Controller, a Keyboard Controller, a Real-Time Clock, Two UARTs, Full Infrared Support and an IEEE1284 Parallel Port,* Jul. 1996, pp. i–xx, 1–50, and 160–164.

Compaq, Digital Equipment Corporation, IBM PC Company, Intel, Microsoft, NEC, Northern Telecom, *Universal Serial Bus Specification,* Apr. 13, 1995, pp. i–viii, 1–111, Revision 0.9.

Fifth Generation Systems, Inc., Unfortunately, everyone working with your company's data may not be working with your company, Jun. 11, 1991, p. 139, DiskLock™ Advertisement, PC Magazine, vol. 10, No. 11, New York, New York.

Rupp Corporation, *User's Manual Fastlock Version 1.0,* Copyright 1989, pp. 1–7, Fastlock File Protection System.

Compaq, *Reference Guide Compaq Deskpro/M,* no date, pp. 5-1 through 5-13, Chapter 5, *Security and Network Features.*

*Primary Examiner*—Nadeem Iqbal
*Attorney, Agent, or Firm*—Akin, Gump, Strauss, Hauer & Feld, LLP

[57] ABSTRACT

A security device and methodology that prevents unauthorized access to general purpose I/O pins in a computer system. In a system according to the invention, secure general purpose I/O pins are utilized as enable signals for data transfer devices such as Universal Serial Port (USB) ports. In one embodiment of the invention, access to the secure general purpose I/O pins is governed by an administrator password that is protected by a memory slot in a security device. When an administrator (or other authorized user) desires access to the general purpose I/O register that controls the secure general purpose I/O pins, the administrator enters the administrator password. If the password is correct, the relevant slot of the security device is unlocked, thereby permitting completion of write cycles to the secure general purpose I/O register. If a write cycle to the secure general purpose I/O register is attempted while the relevant slot in the security device is locked, the write cycle is ignored. Control and monitoring of various system resources in a secure manner is thereby permitted via use of the secure general purpose I/O pins.

20 Claims, 17 Drawing Sheets

U.S. PATENT DOCUMENTS

| | | | |
|---|---|---|---|
| 5,451,934 | 9/1995 | Dawson et al. | 340/825.31 |
| 5,533,125 | 7/1996 | Bensimon et al. | 380/4 |
| 5,657,470 | 8/1997 | Fisherman et al. | 395/480 |
| 5,715,390 | 2/1998 | Hoffman et al. | 395/188.01 |
| 5,721,781 | 2/1998 | Deo et al. | 380/25 |
| 5,852,665 | 12/1998 | Gressel et al. | 380/30 |
| 5,878,256 | 3/1999 | Bealkowski et al. | 395/652 |
| 5,935,244 | 8/1999 | Swamy et al. | 713/200 |
| 6,032,256 | 2/2000 | Bernard | 713/200 |

SECURE GENERAL PURPOSE INPUT/OUTPUT PINS FOR PROTECTING COMPUTER SYSTEM RESOURCES

BACKGROUND OF THE INVENTION

1. Field of the Invention

This invention relates to security in personal computer systems, and more particularly to a technique for preventing unauthorized access to computer system resources through the use of secure general purpose input/output (I/O) pins.

2. Description of the Related Art

The prevention of data theft is extremely important in home computer systems and systems designed to exist on corporate networks. Companies and individuals spend large sums of time and money developing data that resides in these systems. Adequately protecting a computer system's resources from unauthorized access is thus a primary concern of computer users.

To address various security issues, including protection of system ROM and other memory locations, a security device was developed as described in commonly-assigned U.S. patent application Ser. No. 08/779,061, entitled "SECURITY CONTROL FOR PERSONAL COMPUTER," which is hereby incorporated by reference for all purposes as if set forth in its entirety. The security device described therein provides a secure method for access to different system resources. The security device operates by providing multiple hardware "lock" signals capable of being toggled by the user. The lock signals restrict access to specific system resources when asserted. In general, a user enters a password for a particular memory "slot" in the security device. The memory slot is then placed in a "protected" state by issuing a "protect resources" command to the security device. While in the locked state, a lock signal is asserted, which secures system resources. To unlock the slot, the user issues an "access resource" command to the security device, followed by entry of the correct password. Correctly entering a slot's password changes the state of the slot to "unprotected." The security device password may only be written if the slot is in the unprotected state. The security device can only verify and does not divulge the password, thereby enhancing the security of the system.

In the previous security device, a slot (slot 0) is provided to protect the computer system's Flash ROM from unauthorized writes. This slot prevents viruses and unauthorized users from indiscriminately erasing contents of the Flash ROM. After power-up, the BIOS loads the existing Flash ROM password into the slot 0 and executes the "protect resources" command for that slot, thereby disabling writes to the Flash ROM. The security device remains in the protected state until a user successfully enters the password and unlocks the slot.

Another slot (slot 1) is used in the prior device for protecting the power-on password, which is typically stored in battery-backed nonvolatile memory. This slot allows changing of the power-on password during normal run-time. This feature alleviates the necessity of cycling power to the machine in order to change the power-on password.

As generally appreciated by computer system designers, however, providing computer security is not a static process. Technology and concomitant threats to security continue to develop at a rapid pace. Many security threats arise due to the proliferation of networked computers. Neither of the slots in the aforementioned security device could be remotely controlled by a network administrator or authorized network user desiring to access secured features of a network computer incorporating the security device.

Further, computer systems have traditionally incorporated system components—such as PCI/ISA bridges and Super Input/Output (I/O) chips—that provide general purpose I/O pins. The general purpose I/O pins allow for the control and monitoring of various system resources. However, current systems do not provide a method of restricting access to those pins. Restricted access to at least some of the general purpose I/O pins would be desirable in a system context when the pins in question are to be utilized for security purposes.

SUMMARY OF THE INVENTION

Briefly, the present invention provides a run-time security methodology that prevents unauthorized access to general purpose I/O pins in a computer system. The secure general purpose I/O pins prevent data theft through external data transmission devices such as parallel ports or Universal Serial Bus (USB) ports. The secure general purpose I/O pins are utilized as enable signals for such data transfer devices.

In one embodiment of the invention, access to the secure general purpose I/O pins is governed by an administrator password. The administrator password is protected by an additional slot in the aforementioned security device. In general, the administrator password slot is used to prevent access to specific registers that control or disable various system resources. These system resources include the register that governs the status of the secure general purpose I/O pins. In the disclosed embodiment of the invention, the administrator password also functions as a surrogate for the other passwords contained in the security device.

When an administrator (or other authorized user) desires access to the general purpose I/O register, the administrator enters the administrator password. If the password is correct, the additional slot in the security device is unlocked, thereby permitting completion of write cycles to the secure general purpose I/O register. If a write cycle to the secure general purpose I/O register is attempted while the relevant slot in the security device is locked, the write cycle is ignored.

Thus, a security device according to the present invention enhances systems security by controlling access to the register which controls the outputs of the secure general purpose pins, allowing control and monitoring of various system resources in a secure manner via the secure general purpose I/O pins.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

Figure 1A:
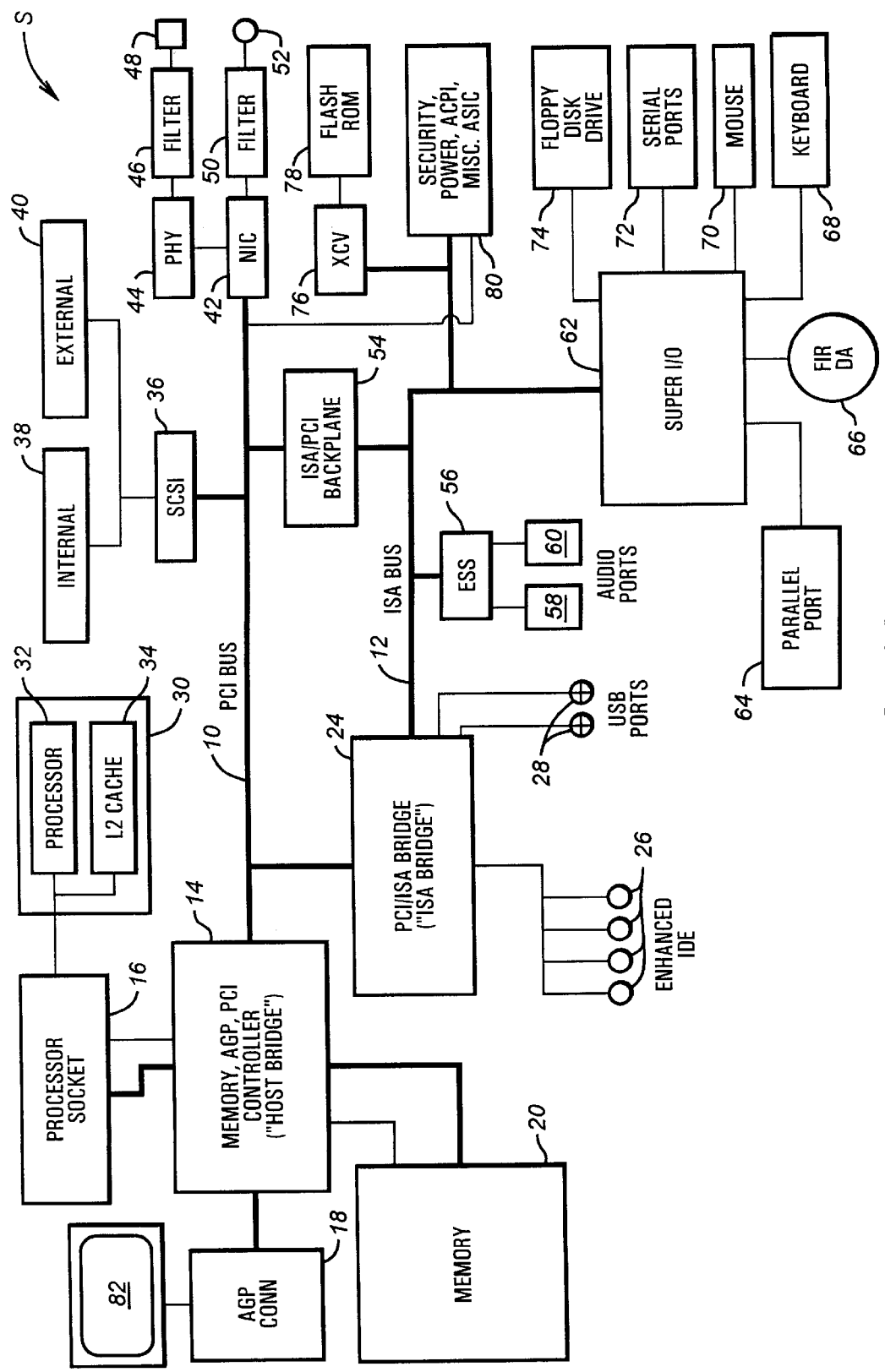
FIG. 1A is a block diagram of a computer system incorporating security features in accordance with the present invention.

Commonly-assigned U.S. patent application Ser. No. 09/070,458, entitled "METHOD AND APPARATUS FOR PROVIDING REMOTE ACCESS TO SECURITY FEATURES ON A COMPUTER NETWORK"; and commonly-assigned U.S. patent application Ser. No. 09/070,457, entitled "SECURITY METHODOLOGY FOR DEVICES HAVING PLUG AND PLAY CAPABILITIES", attorney docket number A97284US, are hereby incorporated by reference for all purposes as if set forth in their entirety.
COMPUTER SYSTEM OVERVIEW Turning first to FIG. 1A, a typical computer system S implemented according to the invention is illustrated. While this system is illustrative of one embodiment of the invention, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, and a memory subsystem 20. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, and the memory subsystem 20. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM), serial presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and non-integral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is an AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to a RJ-45 jack 48, and through a filter 50 to an AUI jack 52. The NIC 42 allows information such as passwords and other data to be received and provided by the computer system S.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional serial ports 72, and a floppy disk drive controller for a floppy disk drive 74. These devices are coupled through connectors to the Super I/O 62.

The ISA bus 12 is also coupled through bus transceivers 76 to a Flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system as set forth in greater detail below. The ASIC 80 includes security features (including a secure general purpose I/O register), system power control, light emitting diode (LED) control, a PCI arbiter, remote wake up logic, system fan control, hood lock control, ACPI registers and support, system temperature control, and various glue logic. Finally, a video display 82 can be coupled to the AGP connector 18 for display of data by the computer system S.

Again, a wide variety of systems could be used instead of the disclosed system S without departing from the spirit of the invention.

Figure 1B:
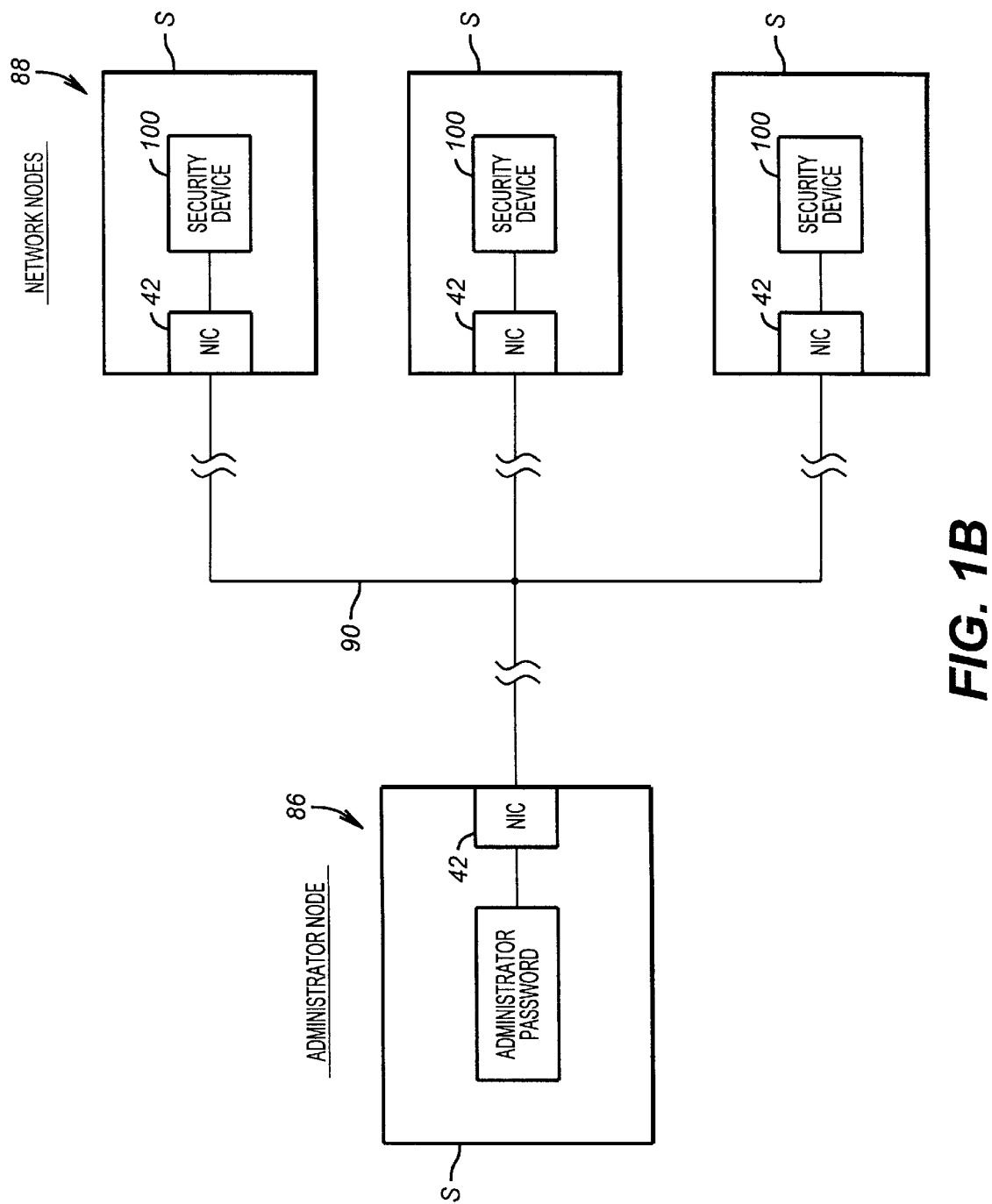
FIG. 1B is a block diagram of a computer network implemented according to the present invention.

Referring now to FIG. 1B, a block diagram of a computer network implemented in accordance with the present invention is illustrated. Briefly, the computer network is comprised of at least one network node 88, which may take the form of the computer S of FIG. 1A. An administrator node 86 is also provided for remotely accessing the security features of the network nodes 88. The network node(s) 88 and the administrator node 86 are coupled via a standard network connection 90.

More specifically, when an administrator desires access to the security features of a particular network node 88, an administrator password is generated in the administrator node 86. The administrator password is provided to a security device 100 of the desired network node 88 via the network interface controllers 42 and network connection 90. If the administrator password is determined to be valid by the addressed network node 88, the administrator is allowed access to the security features of the network node 88, including secure general purpose I/O pins, as detailed more fully below.

Figure 2A:
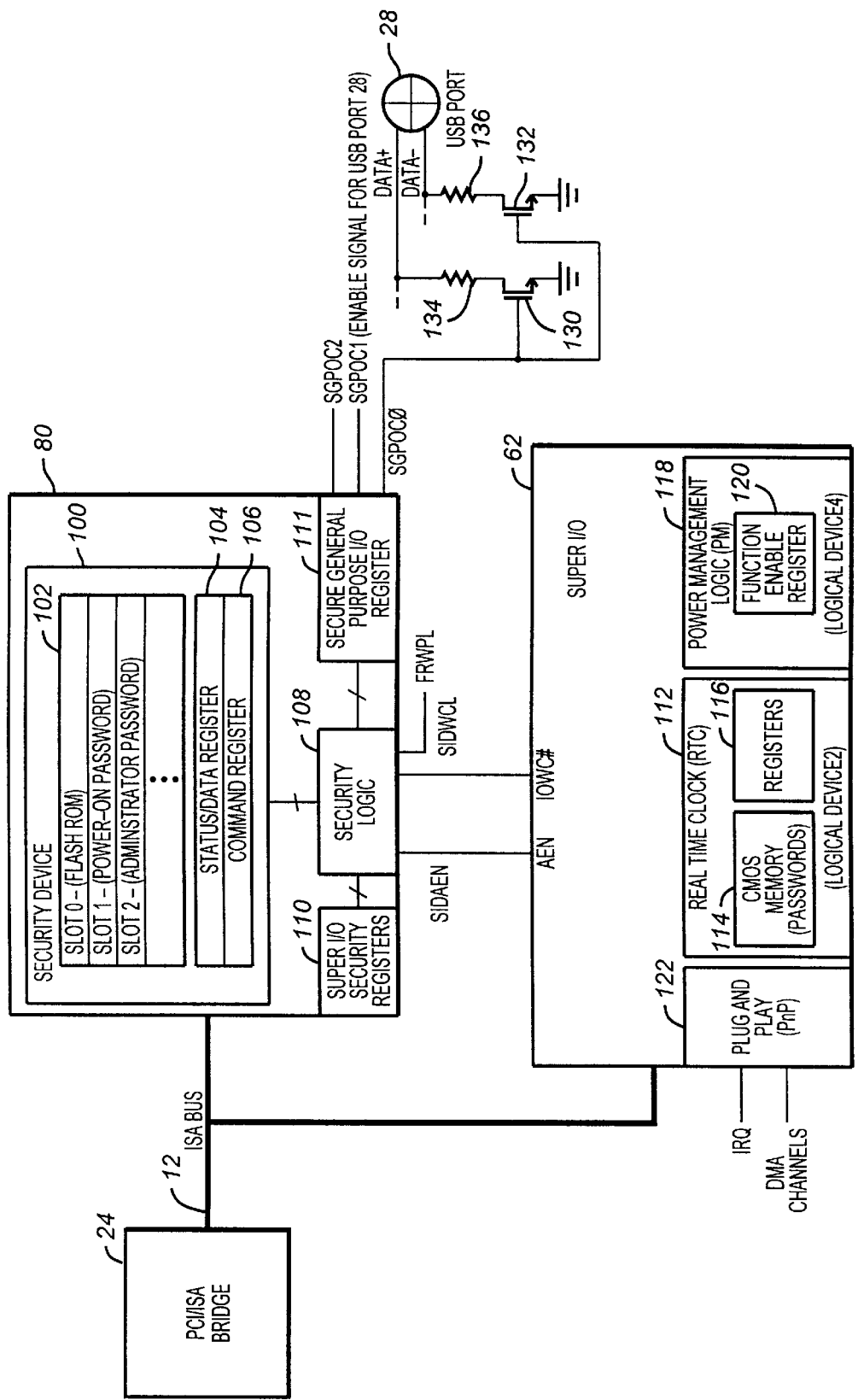
FIG. 2A is a block diagram detailing specific portions of the security features of the computer system of FIG. 1A, including secure general purpose I/O pins.

Referring now to FIG. 2A, a block diagram detailing specific portions of the computer system S of FIG. 1A is provided. The ASIC 80 contains a security device 100 for maintaining an administrator password (slot "2") in accordance with the present invention, although the security device 100 could be implemented in other system components. The preferred embodiment of the security device 100 comprises the following elements: a plurality of memory slots 102 to store passwords for protected resources; a command register 106 for the security device 100; and a status/data register 104 for communicating with the computer system S. These components allow a user key information to be compared to the passwords stored in the memory slots.

The comparison process may be carried out by logic internal to the security device 100, or by other logic such as security logic 108. Although a comparator 332 and associated circuitry for generating unlock signals (see FIG. 5) are described, the precise configuration of the logic used in the comparison process is not considered critical to the invention. However, the contents of the memory slots 102 should not be ascertainable during the comparison process.

The Super I/O chip 62 supports ISA Plug-and-Play functionality, and contains several logical devices. For example, the logical devices of the disclosed embodiment of the invention include the Real Time Clock (RTC) 112 (logical device 2), and Power Management (PM) logic 118 (logical device 8). The RTC 112 contains CMOS memory 114 locations where the power-on password and the administrator password of the disclosed embodiment of the invention are stored for provision to the slots 102 during power-up. The contents of the RTC 112 are maintained during power-down by an external battery. Access to these password locations is restricted to prevent the unauthorized reading or changing of a password. The PM logic 118 contains a Function Enable register 120 used to enable/disable several system hardware resources (devices) located within the Super I/O chip 62. These devices include the parallel port 64, the two serial ports 22, and other resources.

The ASIC 80 of the disclosed embodiment of the invention is capable of preventing read and/or write accesses to various registers of the Super I/O chip 62 by controlling the address enable input AEN and the I/O write control input IOWC# to the Super I/O chip 62. More specifically, security logic 108 within the ASIC 80 drives the address enable input AEN and the input/output write control input IOWC# of the Super I/O chip 62. The Super I/O address enable signal SIOAEN and the Super I/O write control signal SIOWCL are selectively asserted by security logic 108 of the ASIC 80 to prevent the Super I/O chip 62 from decoding read and/or write cycles to the password locations and select registers within the CMOS memory 114 of the Super I/O chip 62.

When the ASIC 80 detects an I/O read or I/O write cycle address to the Super I/O chip 62, the ASIC 80 may block the cycle with programmed security options. Specifically, if access to the particular Super I/O chip 62 resource being addressed has been locked, the current cycle will be blocked and not seen by the Super I/O chip 62. Control of the security logic 108 is described in greater detail below.

Due to the ISA Plug-and-Play capabilities of the Super I/O chip 62, its base I/O address is programmable, as are the base I/O addresses of its logical devices. Several registers must therefore be secured to insure that the appropriate resources are protected. In the disclosed embodiment of the invention, these registers are secured through the use of Super I/O security registers 110 in the ASIC 80, as well as specific signal routing to the Super I/O chip 62 on the system board. Security for the programmable Super I/O chip 62 addresses and the Plug-and-Play logic 122 is described in the previously-incorporated U.S. Patent Application entitled "SECURITY METHODOLOGY FOR DEVICES HAVING PLUG AND PLAY CAPABILITIES."

By using the security device 100 in conjunction with the security registers 116 of the Super 1/0 chip 62, the power-on password is protected by storing the current power-on password in slot "1" of the slots 102 and issuing a PROTECT RESOURCES command. Once slot 1 is loaded with a password and the PROTECT RESOURCES command is executed, it is not possible to read or write the power-on password at its pre-programmed location in the CMOS memory 114 of the Super I/O chip 62.

If slot 1 of the security device 100 has been placed in the PROTECT RESOURCES or PERMANENT LOCK state, and the last data write to the RTC 112 index register corresponds to the power-on password range, the Super I/O address enable signal SIOAEN is forced high for any read or write cycles directed to the data register (not shown) of the RTC 112. This functions to prevent the Super I/O chip 62 from responding to reads and writes to and from the power-on password storage area. When blocking all writes, the Super I/O write control signal SIOWC is manipulated in a similar fashion to the Super I/O address enable signal SIOAEN for blocking reads and writes.

The Flash ROM write protect signal FRWPL, when asserted by the security logic 108, protects the Flash ROM 78 from unauthorized write operations. The Flash ROM write protect signal FRWPL can only be asserted to protect the Flash ROM 78 if a password is stored in slot "0" of the slots 102 followed by a PROTECT RESOURCES or PERMANENTLY LOCK RESOURCES command for slot 0. The Flash ROM write protect signal FRWPL is not asserted following a hardware reset. With respect to slot 2, it is contemplated that the administrator password contained therein could be utilized to secure a variety of system resources in addition to the secure general purpose I/O register 111, including a hood lock register used to prevent unauthorized opening of the chassis of the computer system S and the various Super I/O chip 62 security registers 110.

Commands are preferably issued from the computer to the security device 100 at a predetermined address. Status may be read from the last resource, or slot 102, that is indexed. As noted, the security device 100 is capable of protecting a plurality of resources or slots 102, any of which may be utilized for securing the general purpose I/O pins, either together or separately, of the present invention. A READ STATUS command is configured so that the status/data register 104 for any indexed resource or slot 102 can be read, without affecting other operations occurring to a resource or slot 102, such as unlocking or changing a password. Access to a specific resource or slot 102 in the security device 100 is performed with an indexed address scheme.

As discussed in greater detail below, two addresses are used for the indexing scheme—one address is for the command register 106 (FIG. 2A), while the second address references a status/data register 104. The status/data register 104 functions as a data register for a write cycle and as a status register during a read cycle. The index is placed in the upper three bits of the command register 106. Information regarding the registers 104 and 106 used to control the security device 100 in the ASIC 80 of the disclosed embodiment of the invention is shown in the following table:

Security Device Registers

| Address | R/W | Description | 7 | 6 | 5 | 4 | 3 | 2 | 1 | 0 |
|---------|-----|-------------|---|---|---|---|---|---|---|---|
| 0C06 | R/W | Security Device Command | slot index | | | — | command | | | |
| 0C07 | R | Security Device Status | slot index | | | — | — | plr | delay | lock |
| 0C07 | W | Security Device Data | slot index | | | | | | | |

The format of the command register 106 of the preferred embodiment is as follows:

| Bit(s) | Read or Write | Name | Description |
|--------|---------------|------|-------------|
| [7:5] | R/W | IDX[2:0] | Slot index bits pointing to a particular resource or slot |
| 4 | R/W | Reserved | Reserved bit |
| [3:0] | R/W | CMD[3:0] | Command bits executed by security device |

The slot index, or resource index, encoding in the disclosed embodiment is as follows:

Slot Index Encoding

| Index Bits | | | Slot |
|---|---|---|---|
| IDX2 | IDX1 | IDX0 | Number |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

As can be seen, the disclosed embodiment allows up to eight slots 102, or resources, to be controlled by the security device 100. Bits 0-3 of the disclosed embodiment contain the command sent to the security device 100, encoded as follows:

| Bit | Description |
|-----|-------------|
| [7:5] | Index Bits<br>000 = Select Slot 0 (Flash ROM)<br>001 = Select Slot 1 (Power-On Password)<br>010 = Select Slot 2 (Administrator Password) |
| 4 | Reserved. (Return 0 on read.) |
| [3:0] | Security Device Command<br>0000 = READ STATUS. The next byte read from the status/data register will be the Security Device status.<br>0001 = STORE PASSWORD. The next eight bytes written to the status/data register will be stored as the password. This command is only valid if the resources are protected.<br>0010 = PROTECT RESOURCES. Enables protection by the Security Device after storing a password or after access to a secured resource is completed.<br>0100 = ACCESS RESOURCES. The next eight bytes written to the status/data register will be compared against the stored password. If all eight bytes are the same, the Security Device slot will unlock the referenced resources. A PROTECT RESOURCES command should next be given so that the resource is once again protected.<br>1000 = PERMANENTLY LOCK RESOURCES. Access to the block box slot is prohibited until the ASIC 80 is reset. A status/data register read is possible. |

In addition to sending commands to the security device 100, status can be read from the security device 100 at any time by reading the status/data register 104, which is preferably located at a second predetermined address adjacent to the first predetermined address. The status/data register 104 serves two functions. When serving as a data register, the status/data register 104 is used when storing passwords or verifying passwords (accessing resources).

To store passwords, a STORE PASSWORD command must first be sent to the security device 100. Then, the next eight writes to the status/data register 104 cause the data written to the status/data register 104 to be stored as the password for the indexed slot 102 in the security device 100. Eight bytes are preferably written to the status/data register 104 in the disclosed embodiment, although the actual size of the status/data register 104 may be smaller or greater. If another command for the security device 100 arrives before all eight bytes have been stored for the password, the password storage operation for the indexed slot 102 in the security device 100 aborts and the password then contains undefined data.

The status/data register 104 provides status information on a particular resource when read. The status/data register 104 of the disclosed embodiment of the invention is defined below:

| Bit | Description |
|---|---|
|  | WRITE |
| [7:0] | Password Byte. Writing a password byte is valid only if a STORE PASSWORD or ACCESS RESOURCES command was previously issued. The least significant byte should be written first. |
|  | READ |
| [7:5] | Index Bits [2:0].<br>000 = Select Slot 0 (Flash ROM)<br>001 = Select Slot 1 (Power-On Password)<br>010 = Select Slot 2 (Administrator Password) |
| [4:3] | Reserved (return 0 on read). |
| 2 | Permanently Locked Resource.<br>1 = Slot Permanently locked until ASIC 80 is reset<br>0 = Slot not permanently locked |
| 1 | Delay.<br>1 = Delay in progress (Password mismatch). The only time a delay will occur is when there is a password mismatch during an ACCESS RESOURCES command. A one-second delay will occur before a password can be tried again. Software should poll this bit after issuing the eighth byte to the Security Device when verifying a password to see if a delay is occurring. If the delay bit is 0 after issuing the eighth byte, then there is no delay and the password was OK - protected resources are now accessible.<br>0 = No delay in progress (Password Ok). |
| 0 | Lock.<br>1 = Resources protected<br>0 = Resources unprotected |

Bits 7-5 provide an indication of which particular resource or slot 102 the remaining bits identify. The Permanently Locked Resource (PLR) bit indicates when set that the indexed resource is permanently locked. The Delay bit indicates, when set, that a one second delay is in progress due to a password mismatch. The Lock bit is indicative of the state of the UNLOCK_pin or signal (described below) for the indexed resource.

In general, to verify a password after the security device has been initialized, an ACCESS RESOURCES command is first sent to the security device 100. Then, the next eight writes to the status/data register 104 cause the byte written to the status/data register 104 to be compared against a byte of the password stored in the security device 100. If the correct password is provided, the resource is unlocked. Otherwise the security device 100 is unavailable for one second before the next command can be sent. In the disclosed embodiment of the invention, entry of a valid administrator password in slot 2 unlocks all of protected resources, allowing a network administrator remote access to all of the secured features of the computer system S, including the secure general purpose I/O register 111.

Of particular note in the disclosed embodiment of the invention, the ASIC 80 also includes a secured general purpose I/O register 111 for providing secure general purpose I/O pins. To write to this register, slot 2 of the security device 100 must be unlocked, although it is contemplated that any of the slots could be used to control access to this circuitry. The secure general purpose I/O register 111 of the disclosed embodiment takes the following form:

| Bit | Description |
|---|---|
| [7] | Reserved. This bit may be written, but performs no function in the disclosed embodiment of the invention. In effect, it is a one bit storage register. Reads will return the last value written to this bit |
| [6] | SGPOC2 Output Enable. This bit controls the output enable and output value of the SGPOC2 pin. This bit is read/write. Writes to this bit are ignored when Slot 2 of the security device 100 is locked.<br>1 = Output disabled. SGPOC2 output is tri-stated. The value of SGPOC2 is set to a logic high level "1" via an external pull up resistor.<br>0 = Output enabled. SGPOC2 output is on and drives a logic low level "0". |
| [5] | SUSCL. This bit is tied to the input buffer on the SUSCL pin and reflects the value of that pin. In the disclosed embodiment of the invention, this pin is utilized to synchronize power management functions between the ASIC 80 and other system components. This bit is read only. |
| [4] | SGPOC2. This bit is tied to the input buffer on the SCPOC2 pin and reflects the value of that pin. This bit is read only. |
| [3] | SGPOC1 Output Enable. This bit controls the output enable and output value of the SGPOC1 pin. This bit is read/write. Writes to this bit are ignored when Slot 2 of the security device 100 is locked.<br>1 = Output disabled. SGPOC1 output is tri-stated. The value of SGPOC1 is set to a logic high level "1" via an external pull up resistor.<br>0 = Output enabled. SGPOC1 output is on and drives a logic low level "0". |
| [2] | SGPOC0 Output Enable. This bit controls the output enable and output value of the SGPOC0 pin. This bit is read/write. Writes to this bit are ignored when Slot 2 of the security device 100 is locked.<br>1 = Output disabled. SGPOC0 output is tri-stated. The value of SGPOC0 is set to a logic high level "1" via an external pull up resistor.<br>0 = Output enabled. SGPOC0 output is on and drives a logic low level "0". |
| [1] | SGPOC1. This bit is tied to the input buffer on the SCPOC1 pin and reflects the value of that pin. This bit is read only. |
| [0] | SGPOC0. This bit is tied to the input buffer on the SCPOC0 pin and reflects the value of that pin. This bit is read only. |

In the disclosed embodiment, the signals provided by the secure general purpose I/O pins SGPOC0 and SGPOC1 driven by the secure general purpose I/O register 111 are utilized as enable signals for the USB ports 28. As shown, for example, the output of the secure general purpose I/O pin SGPOC0 can be utilized as a control input to the gates of pull-down transistors 130 and 132. The source terminals of the pull-down transistors 130 and 132 are coupled to a ground plane, while the drain terminals of the pull-down transistors 130 and 132 are coupled to the data signal lines DATA+ and DATA− of a USB port 28 via resistors 134 and 136, respectively. In operation, assertion of the output of the secure general purpose I/O pin SGPOC0 places the pull-down transistors 130 and 132 in a conductive state, thereby clamping the data signal lines DATA+ and DATA− of the USB port 28 to ground and effectively disabling the USB port 28. Alternatively, the transistors 130 and 132 could be configured as pass transistors for the data signal lines DATA+ and DATA−.

Although not explicitly detailed, the secure general purpose I/O pin SGPOC1 can be utilized as an enable signal in a similar manner to that disclosed for the secure general purpose I/O pin SGPOC0, or may be provided to control inputs of the PCI/ISA bridge 24 to disable a USB port 28. The secure general purpose I/O pins SGPOC0, SGPOC1 and SGPOC2 may also be used to control other communication resources of the computer system S in order to prevent an unauthorized user from extracting data from the computer system S.

Figure 2B:
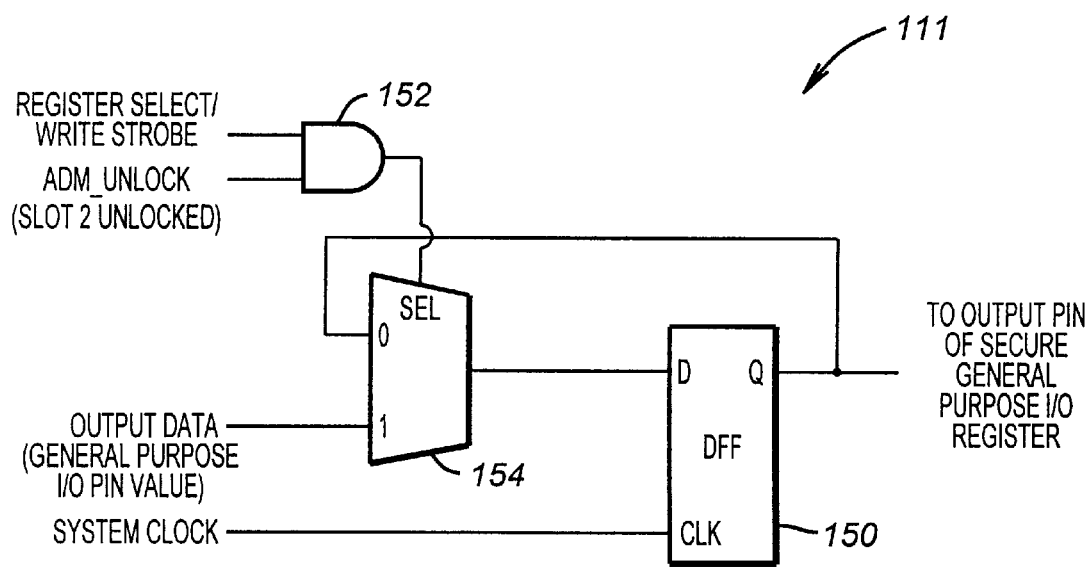
FIG. 2B is a schematic diagram of security logic in accordance with the present invention for restricting access to a general purpose I/O pin.

Referring now to FIG. 2B, a schematic diagram of an exemplary portion of a secure general purpose I/O register 111 is shown. The logic value driven by the aforementioned outputs pins of the secure general purpose I/O register 111 are determined by a series of D-type flip-flops 150. Only one such D-type flip-flop 150 is shown in FIG. 2B for sake of clarity, although it will be appreciated by those skilled in the art that each of the secured general purpose I/O pins controlled by the secure general purpose I/O register 111 may utilize circuitry such as that shown in FIG. 2B.

The input to the D-type flip-flop 150 is driven by a 2:1 multiplexer 154. The "0" input of the 2:1 multiplexer 154 is driven by the output of the D-type flip-flop 150, while a second input (the "1" input) is driven by output data or write data to the secure general purpose I/O register 111. The clock input CLK of the D-type flip-flop 150 is driven by the system clock of the ASIC 80.

The select input SEL of the 2:1 multiplexer 154 is driven by the output of a 2-input AND gate 152. One input to the AND gate 152 is driven by a register select/write strobe signal generated by address decode logic (not shown) of the ASIC 80. This input is asserted following a write cycle directed towards the secure general purpose I/O register 110. The second input of the AND gate 152 is driven by an administrator ADM_UNLOCK signal that is asserted when slot 2 of the security device 100 is unlocked. Details of the administrator unlock signal ADM_UNLOCK are provided below in conjunction with FIG. 6.

In operation, a write signal directed to the secure general purpose I/O register 111 causes assertion of the register select/write strobe signal. Corresponding write data is provided at the "1" input of the 2:1 multiplexer 154. However, in order for the output data to be provided to the D-type flip-flop 150, the select input SEL to the 2:1 multiplexer 154 must be asserted. The select input SEL is asserted only when slot 2 is unlocked and the output of the AND gate 152 is asserted during a write cycle to the secure general purpose I/O register 111. If slot 2 is not unlocked, the data present at the "0" input of the 2:1 multiplexer 154 (i.e., the output of the D-type flip-flop 150) is provided to the input of the D-type flip-flop 150. Thus, the value driven by the secure general purpose I/O pins can only be modified when slot 2 is unlocked. Writes to the secure general purpose I/O register 111 are otherwise ignored.

Figure 3A:
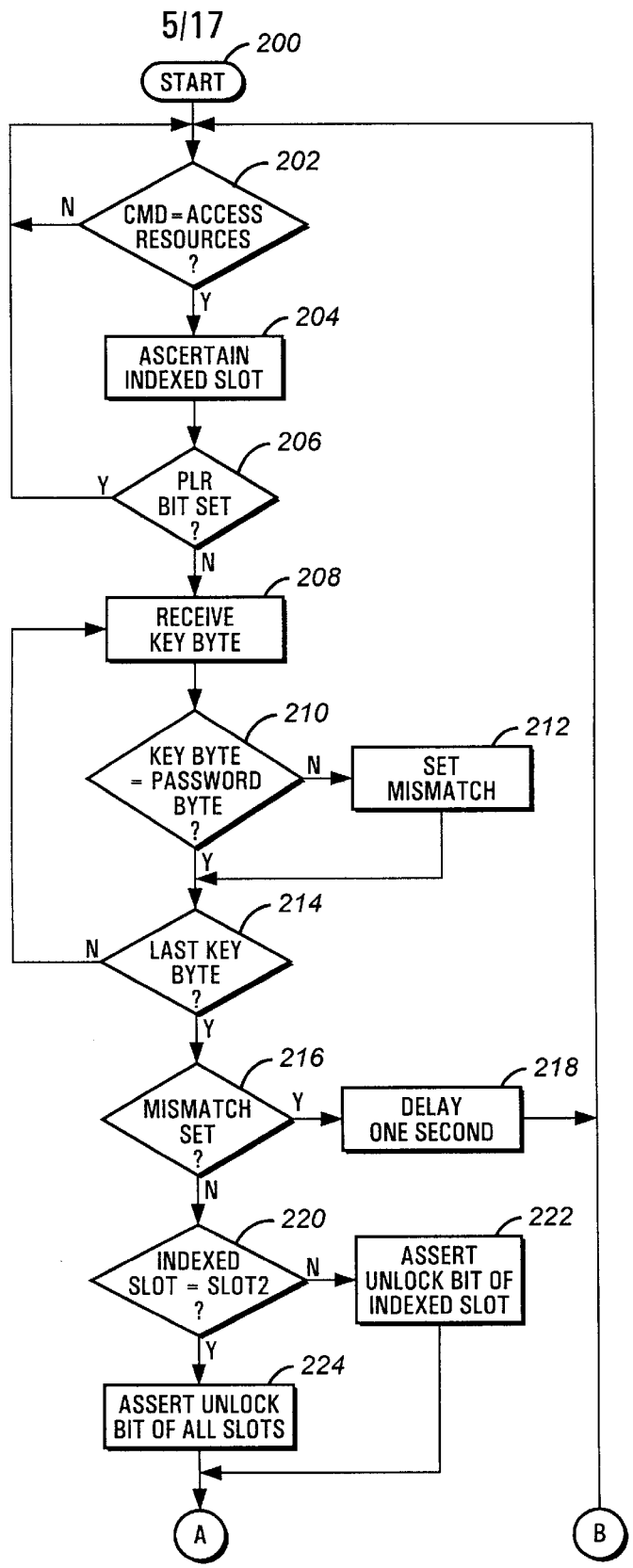
FIGS. 3A and 3B are flow diagrams of a security management process in accordance with the present invention.
Figure 3B:
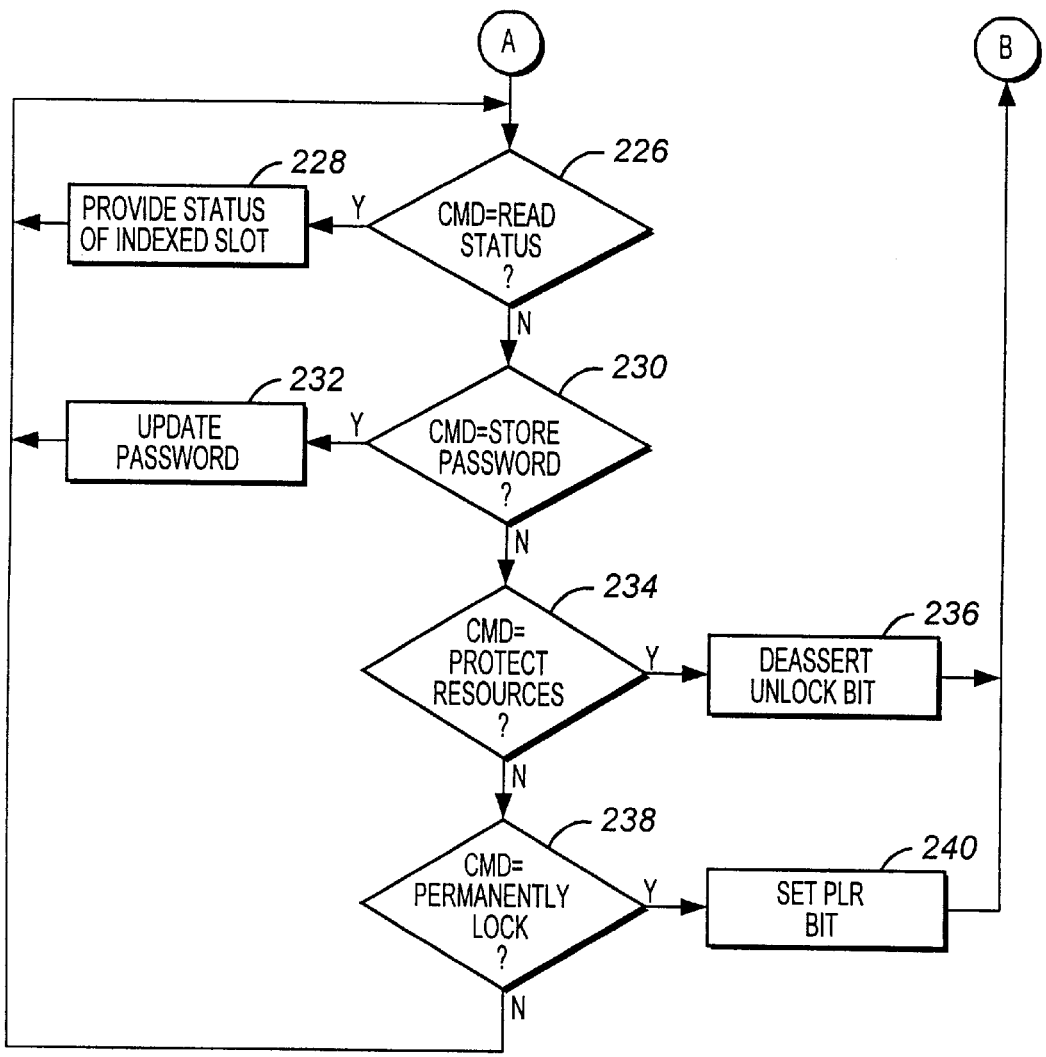

Turning to FIGS. 3A and 3B, the general process of unlocking a slot 102 after initialization is shown. Following commencement of the process in step 200, the process proceeds to step 202 to determine if an ACCESS RESOURCES command has been received by the security device 100. Until an ACCESS RESOURCES command is received, the process essentially loops at step 202. It is noted that an ACCESS RESOURCES command is generally preceded by a PROTECT RESOURCES command during initialization, as described in greater detail in conjunction with FIG. 11. Next, in step 204, the indexed slot is ascertained. The process proceeds to step 206 where a determination is made if a permanent lock resources (PLR) bit has been set. A set PLR bit indicates that a PERMANENTLY LOCK RESOURCES command has been issued. If so, the ACCESS RESOURCES command is ignored and the process returns to step 202. Once the ACCESS RESOURCES command has been received and it is determined that the indexed resource or slot 102 is not permanently locked, the process proceeds to step 208 and the security device 100 receives a byte representative of a key or password. The key or password byte is written to the status/data port at step 208. This byte is compared against the appropriate byte in the password stored in the indexed slot 102. Bytes written to the status/data register 104 are received in the same order as initially received with the STORE PASSWORD command. If a key byte fails to match a corresponding password byte as determined in step 210, a MISMATCH bit is set at step 212. Following either of steps 210 or 212, the process proceeds to step 214 to determine if the last byte—the eighth byte in the preferred embodiment—has been checked. The status/data register 104 is not updated until all eight bytes have been received.

In the disclosed embodiment, eight compares must occur before the result of the verification is checked. If a command is written to the command register 106 when the security device 100 is expecting to receive bytes to compare against the stored password, the password verification phase is aborted and the command that was received by the security device 100 is ignored. After the last byte has been received as determined in step 214, the process proceeds to step 216 to determine if the MISMATCH bit is set. If so, the process continues at step 218 and all UNLOCK_pins or signals are kept deasserted and a one-second delay occurs before another attempt to access the security device 100 is permitted. The process then returns to step 202.

If the MISMATCH bit is not set as determined in step 216, the ACCESS RESOURCES command has been validated, and the process proceeds to step 220 to determine if the indexed slot is slot "2". If not, the UNLOCK_pin or signal for the indexed slot 102 is asserted in step 222, thereby unlocking the slot 102. In the disclosed embodiment of the invention, the UNLOCK_pin or signal for all of the slots 102 are asserted in step 224 if the indexed slot is slot 2. Once the UNLOCK_pin or signal for a given slot 102 has been asserted, the security device 100 responds to all commands directed to that slot. In the disclosed embodiment of the invention, unlocking all slots in step 224 permits the administrator or other authorized user to write to the secure general purpose I/O register 111. This process is described more fully below in conjunction with FIG. 17.

Following either of steps 222 or 224, the process proceeds to step 226 (FIG. 3B) to determine if a READ STATUS command has been received. If so, the security device 100 enables the status/data register 104 of the indexed slot 102 to divulge the status of that slot 102. Alternatively, the status/data register 104 can be configured to provide status information without entry of a password.

If the command is a STORE PASSWORD command as determined in step 230, the next eight bytes written to the status/data register 104 are stored as the new password in step 232. If the command is not a STORE PASSWORD command, the process proceeds to step 234 to determine if a PROTECT RESOURCES command has been received. If so, the UNLOCK_pin or signal for the indexed slot(s) are deasserted in step 236, such that a new password verification is required. Once this command is given, the only way to change the status of the security device 100 is to reissue an ACCESS RESOURCES command and enter a correct password.

If the received command is a PERMANENTLY LOCK RESOURCES command as next determined in step 238, the process proceeds to step 240 and the PLR bit is set. As mentioned above, setting the PLR bit functions to permanently lock all secured resources. Access to protected system resources is no longer permitted unless power is cycled, although it is still possible to read the status/data register 104. The PERMANENTLY LOCK RESOURCES command may be used, for example, to prevent any access to the Flash ROM 78 following a secure power-up procedure. Following either of steps 236 or 240, control returns to step 202. Following step 228, step 232, or step 238 (if the command is not a PERMANENTLY LOCK RESOURCES command), the process returns to step 226.

Figure 4:
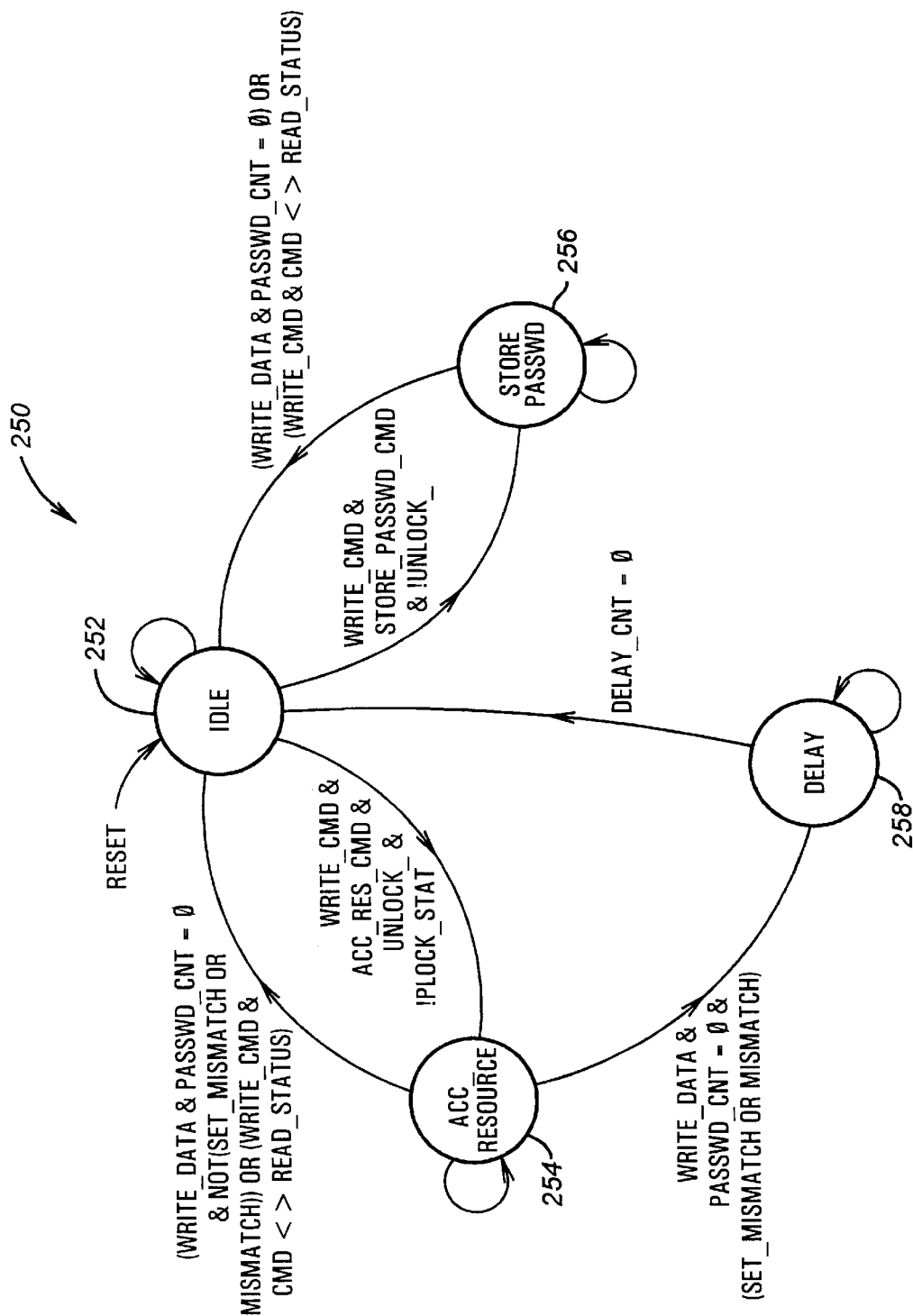
FIG. 4 is a state machine used in implementing the security management process of FIGS. 3A and 3B.

Turning to FIG. 4, a state machine 250 used in implementing a security management system according to the present invention is disclosed. The states of the state machine 250 are sequenced on the falling edge of a write instruction to the command register 106. As shown in FIG. 4, the state machine 250 has an IDLE state 252, an ACC_RESOURCE state 254 (in which access to a secured resource may be granted), a STORE_PASSWD state 256 (in which a new password can be stored), and a DELAY state 258 for delaying responses for a specified period of time, preferably one second, if the password key provided does not match a stored password.

Upon reset, the state machine 250 is in the IDLE state 252. In this state, only commands are accepted. The IDLE state 252 transitions to the ACC_RESOURCE state 254 under the following circumstances: a command is written to the command register 106 (WRITE_CMD), the command is an access resource request (AC_RES_CMD), the locked or unlocked status signal or pin (UNLOCK_) for the indexed slot 102 is deasserted, and the lock status signal (PLOCK_STAT) is not asserted. The PLOCK_STAT signal, if not asserted, indicates that the PERMANENTLY LOCK RESOURCES command has not been issued. Once in the ACC_RESOURCE state 254, the state machine 250 may transition back to the IDLE state 252 or to the DELAY state 258.

The transition from the ACC_RESOURCE state 254 to the IDLE state 252 occurs when the following conditions are met: data is written to the status/data register 104 (WRITE_DATA); the password count equals zero (PASSWD_CNT= 0), indicating that all eight bytes have just been written; and either the SET_MISMATCH or MISMATCH signals are deasserted. The SET_MISMATCH signal is set when the current byte being compared is a mismatch, while the MISMATCH signal indicates a mismatch with a byte previously written on a given attempt. The transition from the ACC_RESOURCE state 254 to the IDLE state 252 also occurs when a command other than a READ STATUS command is written to the command register 106. The transition from the ACC_RESOURCE state 254 to the DELAY state 258 occurs when data is written to the status/data register 104 (WRITE_DATA); the password count equals zero, indicating the last byte has been written; and either the SET_MISMATCH or the MISMATCH signal is asserted. The transition from the ACC_RESOURCE state 254 to the DELAY state 258 occurs when a password key and an indexed password do not match.

A delay of one second is preferably encountered upon entry to the DELAY state 258. This period is clocked by a count-down counter 398 (FIG. 8), whose output is DELAY_COUNT. Thus, upon DELAY_COUNT reaching zero, the DELAY state 258 transitions back to the IDLE state 252.

The IDLE state 252 can also transition to the STORE_PASSWD state 256 when a request to the command register 106 (WRITE_CMD) to update the password (STORE_PASSWD_CMD) is received by the security device 100 while the unlock status signal (UNLOCK_) is asserted. The STORE_PASSWD state 256 transitions back to the IDLE state 252 when data is written to the data register (WRITE_DATA) and the password count equals zero (PASSWD_CNT=0), signifying that the last byte of a new password has been accepted. The STORE_PASSWD state 256 also transitions back to the IDLE state 252 when any command other than the READ STATUS command (READ_STATUS) is asserted before the new password is downloaded. Hence, if a command is sent before all password bytes are received, the state machine 250 transitions back to the IDLE state 252 with the password being only partially updated. It should be assumed that such a password contains unknown values.

Referring now to FIGS. 5, 6, 7 and 8, logic for providing the signals to the state machine 250 is disclosed in greater detail. When the state machine 250 is in the IDLE state 252 and a READ STATUS command is encountered, a LATCH STATUS signal is asserted via an AND gate 300 (FIG. 5) in conjunction with an OR gate 346. When the state machine 250 is in the IDLE state 252, the command is STORE PASSWORD and the UNLOCK_signal is asserted low, an inverter 306, an AND gate 302 and an OR gate 304 function to assert the SET_PASSWD_CNT signal. The SET_PASSWD_CNT signal driven by the output of the OR gate 304 is also asserted via the output of an AND gate 314 when the state is IDLE, the UNLOCK signal is deasserted (at a logic high value in the disclosed embodiment), the lock status bit (PLOCK_STAT) is false, and the ACCESS RESOURCES command is present. The output of the AND gate 314 also drives the clear mismatch (CLR_MISMATCH) signal.

When the state machine 250 is in the IDLE state 252 while the command is PROTECT RESOURCES (PROT_RESOURCE) and the UNLOCK_signal is asserted, the SET_PROT signal is asserted via an AND gate 308 in conjunction with an OR gate 310. The SET_PROT signal is also asserted by the output of the OR gate 310 based upon an input from an AND gate 316, which asserts its output when the state is the IDLE state 252, the UNLOCK_signal is asserted low, and the command is PERMANENTLY LOCK RESOURCES (the PERMANENT_LOCK is asserted). The output of the AND gate 316 also drives the SET_PLOCK signal.

When the state machine 250 is in the STORE_PASSWD state 256 while data is being written to the data register (the WRITE_DATA signal is asserted), an AND gate 318 asserts the SET_PASSWD signal and the EN_PASSWD_CNT signal is asserted through an OR gate 320. Further, when in the STORE_PASSWD state 256 while the READ STATUS command is written to the command register 106, the LATCH_STATUS signal is asserted via an AND gate 322 and the OR gate 346.

Figure 8:
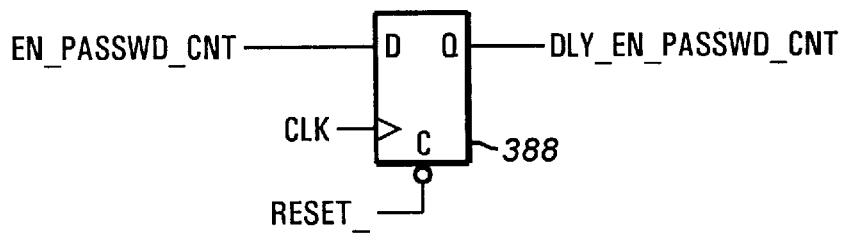
Figure 8:
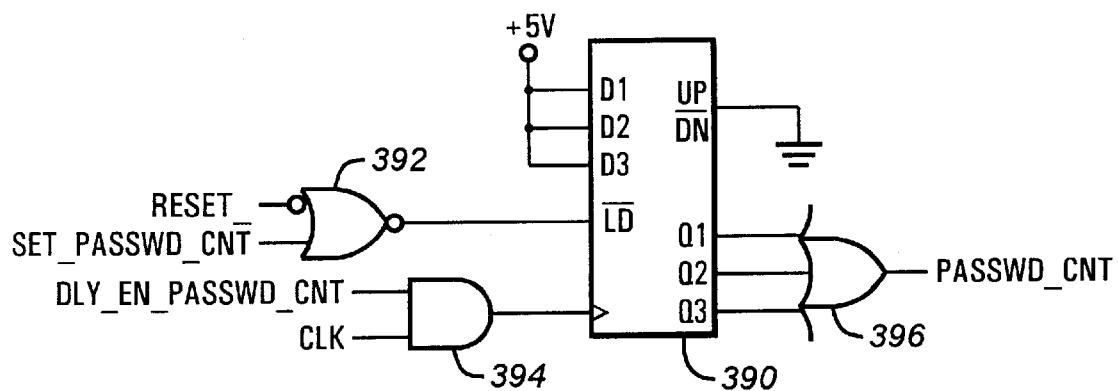
Figure 8:
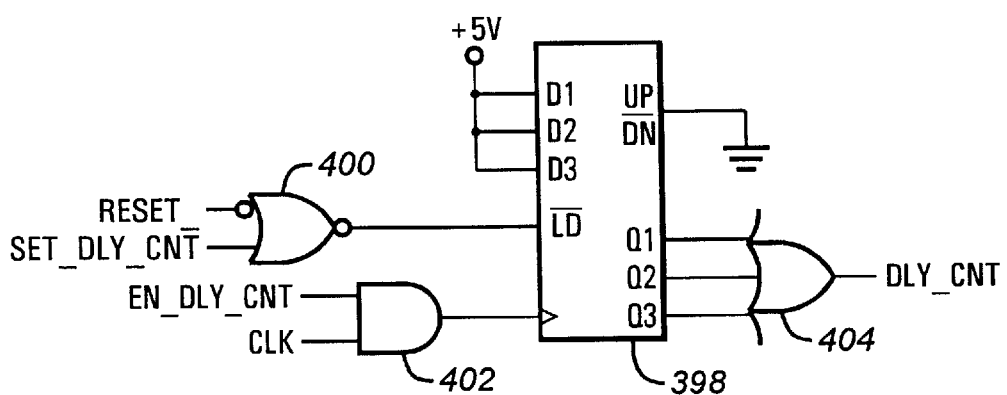

When the state machine 250 is in the ACC_RESOURCE state 254 while data is written to the status/data register 104, the EN_PASSWD_CNT signal is asserted via an AND gate 324 and the OR gate 320. Further, the output of the AND gate 324 is provided to one input of the AND gate 326. The second input of the AND gate 326 is driven by the output of a comparator 322, which compares the proper byte in a password register 328 with a key register 330. The output of the AND gate 326 provides the SET_MISMATCH signal. The password register 328 is actually the depth of the password (eight bytes in the preferred embodiment), and the proper byte is selected based on a value provided by a password counter 390 (FIG. 8). The key register 330 need only be a single byte register, as the previous bytes of the key need not be stored. The SET_MISMATCH signal indicates a mismatch of the current byte, and is latched to indicate that a mismatch has already occurred in a previous clock period.

The output of the latching operation, the MISMATCH signal, is gated with the SET_MISMATCH signal via a NOR gate 334. The output of the NOR gate 334 is logically AND'ed with the output of the AND gate 324 and a PASSWD_CNT=0 signal by an AND gate 336 to generate the CLR_PROT signal. The output of the NOR gate 334 is further inverted by an inverter 338 and then gated with the output of the AND gate 324 and the PASSWD_CNT=0 signal by an AND gate 340 to generate the delay signals SET_DLY and SET_DLY_CNT.

When the state machine 250 is in the ACC_RESOURCE state 254 while a READ STATUS command is written to the command register 106, an AND gate 342 asserts the LATCH_STATUS signal via the OR gate 346. The LATCH_STATUS signal is also asserted by the AND gate 344 when the state machine 250 is in the DELAY state 258, the write command signal (WRITE_CMD) is asserted and the command is READ STATUS. The clear delay signal CLR_DLY is provided by the output of an AND gate 348, and is asserted when the DLY_CNT=0 signal is asserted while the current state is the DELAY state 258.

Figure 6:
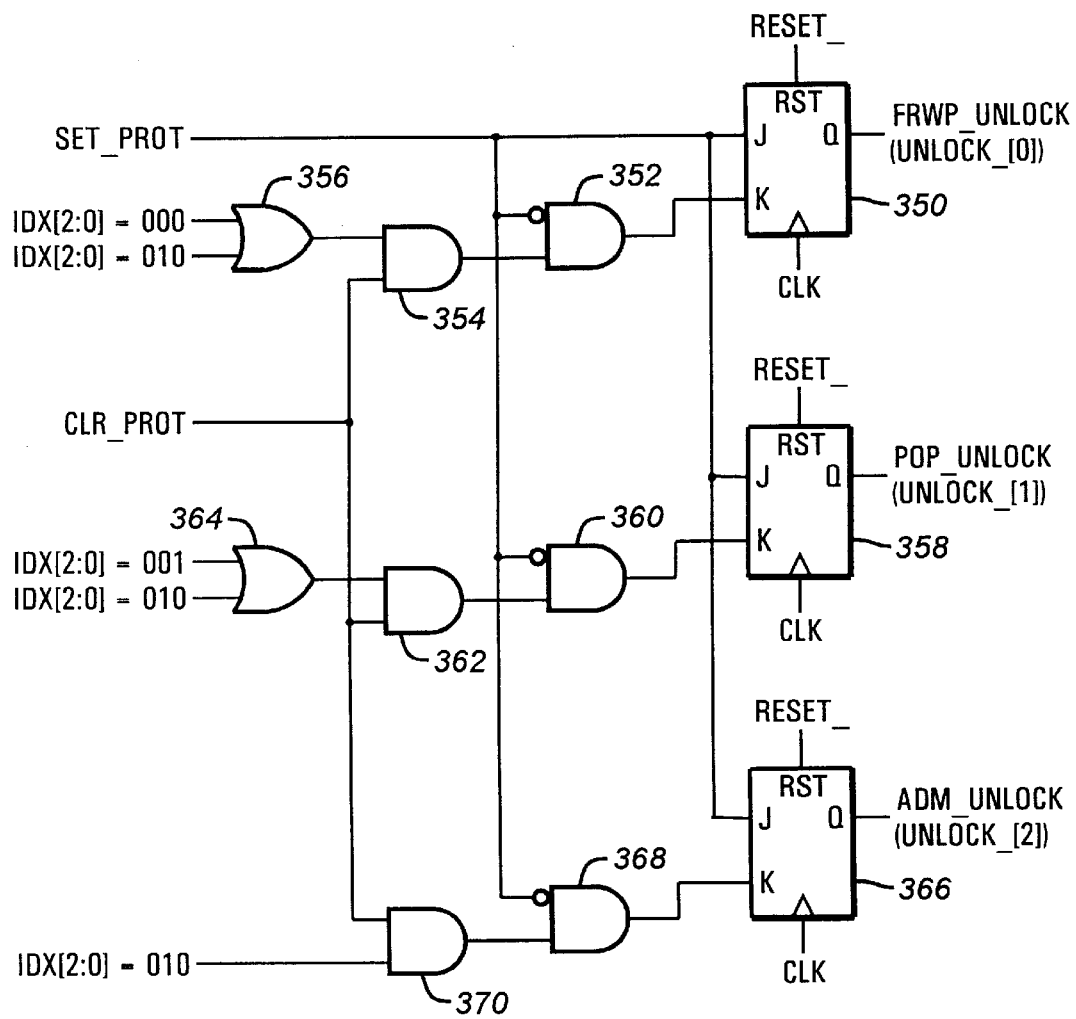
Figure 7:
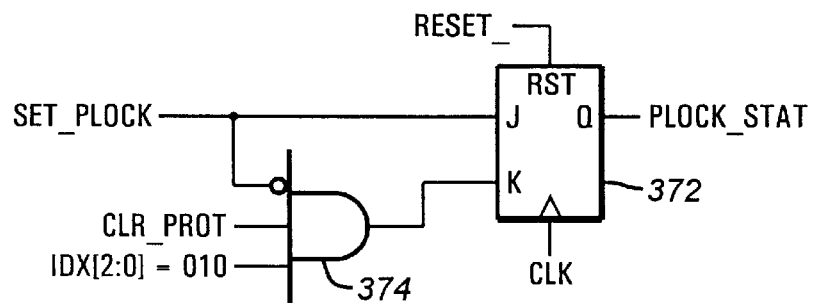
Figure 7:
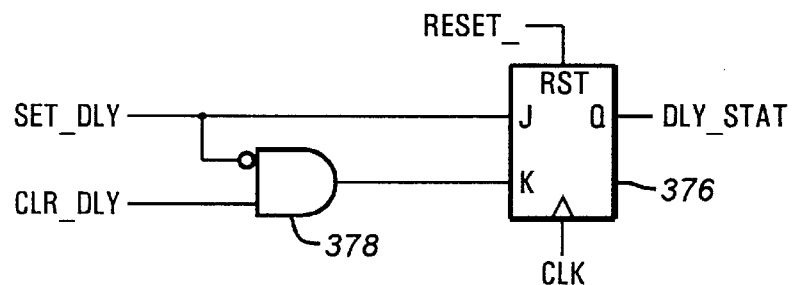
Figure 7:
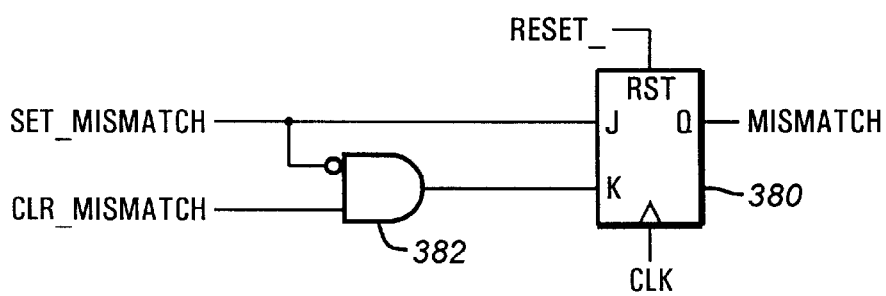
Figure 7:
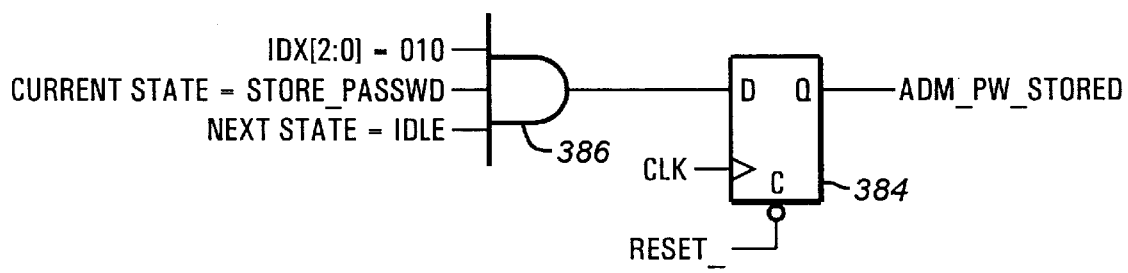

Turning to FIGS. 6 and 7, each of a series of JK-type flip-flops 350, 358, 366, 372, 376 and 380 have a reset input RST tied to the signal for resetting the computer (RESET_) and a clock input tied to the clock signal CLK, which is preferably an oscillator signal from the ISA bus 12, but could be any suitable clock signal. As shown in FIG. 6, the output of the flip-flop 350 drives the FRWP_UNLOCK signal (UNLOCK_[0]), which is used to unlock the slot 102 protecting the Flash ROM 78. The output of the flip-flop 358 drives the POP_UNLOCK signal (UNLOCK_[1]), which is used to unlock the power-on password slot 102. Similarly, the output of the flip-flop 366 drives the ADM_UNLOCK signal (UNLOCK_[2]), which unlocks the administrator password slot 102 and permits access to the secure general purpose I/O registers 111 (see FIG. 2B).

Figure 5:
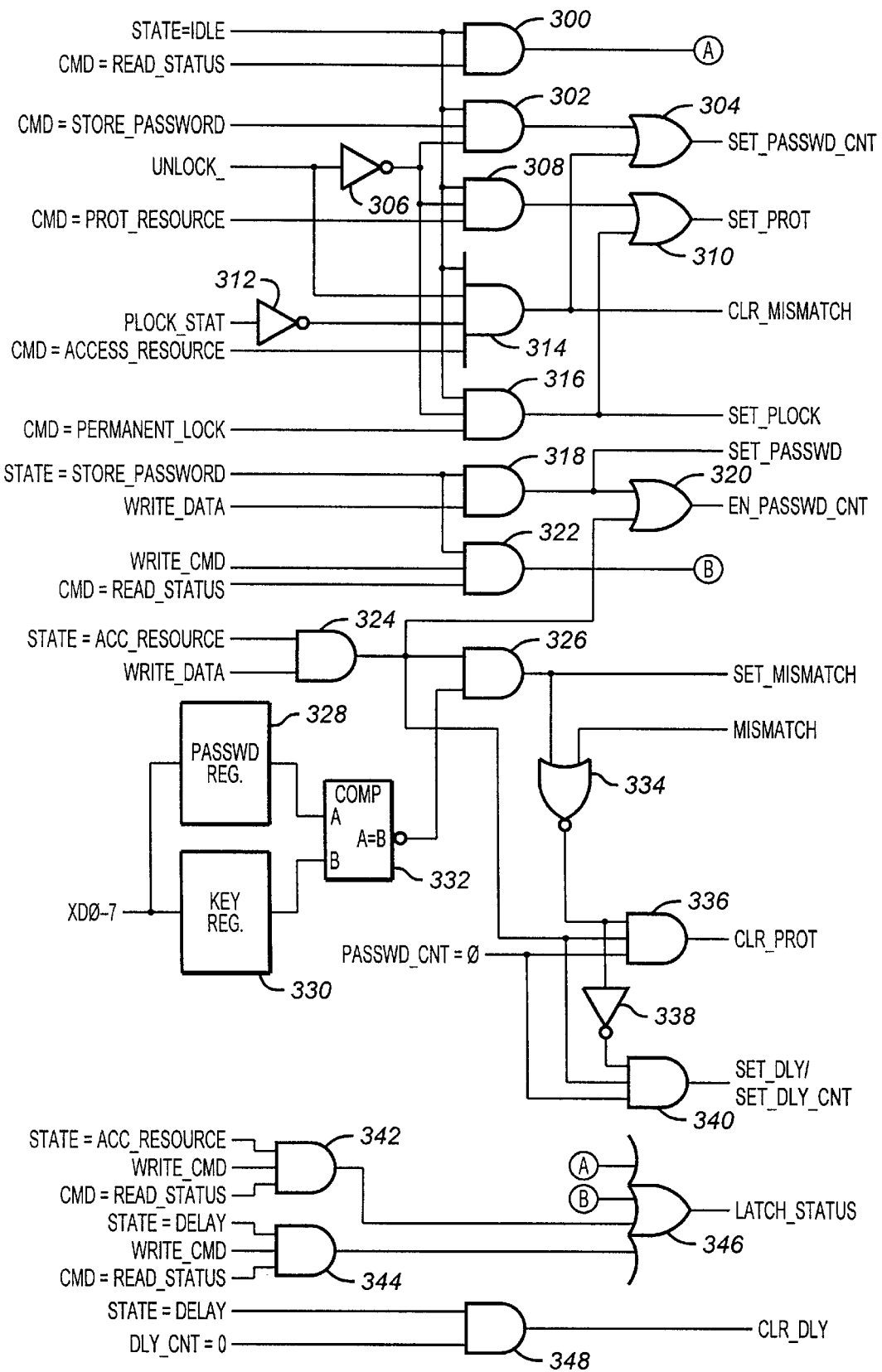
FIGS. 5, 6, 7 and 8 are schematic diagrams of portion of the security management system associated with the state machine of FIG. 4.

The J input of each of the flip-flops 350, 358 and 366 are driven by the SET_PROT signal generated by the circuitry of FIG. 5. When asserted, this signal indicates that an indexed slot(s) is to be unlocked. The K input of the flip-flop 350 is asserted by AND gates 352 and 354 in conjunction with an OR gate 356 when the slot index bits IDX[2:0] are set to index either slot 0 (000) or slot 2 (010), and the CLR_PROT signal is asserted. Similarly, the K input of the flip-flop 358 is asserted by AND gates 360 and 362 in conjunction with an OR gate 364 when the slot index bits IDX[2:0] are set to index either slot 1 (001) or slot 2 (010), and the CLR_PROT signal is asserted. The K input of the flip-flop 366 is asserted by AND gates 368 and 370 when the slot index bits IDX[2:0] are set to index slot 2 (010) and the CLR_PROT signal is asserted. In this manner, the output of the flip-flop 350, 358 or 366 corresponding to an indexed slot(s) 102 is asserted during the next clock transition and is made active by issuing a PROTECT RESOURCES command or a PERMANENTLY LOCK RESOURCE command to the security device 100.

Referring now to FIG. 7, the PLOCK_STAT signal of an indexed slot (shown as slot 2) is driven by the output of a flip-flop 372. The J input of the flip-flop 372 receives the SET_PLOCK signal, while the K input is driven by the output of an AND gate 374. The output of the AND gate 374 is asserted if the SET_PLOCK signal is deasserted while the CLR_PROT signal is at a logic high level and the slot index bits IDX[2:0] reference slot 2. The PLOCK_STAT signal is updated during each clock signal transition.

The delay status signal DLY_STAT for an indexed slot 102 is driven by the output of a flip-flop 376. The J input of the flip-flop 376 receives the SET_DLY signal, while the K input is driven by the output of an AND gate 378. The output of the AND gate 378 is asserted if the SET_DLY signal is deasserted while the CLR_DLY signal is at a logic high level. In this manner, the flip-flop 376 generates the DLY_STAT signal during the next clock signal transition.

Similarly, the clear mismatch signal CLR_MISMATCH is driven by the output of a flip-flop 380. The J input of the flip-flop 380 receives the SET_MISMATCH signal, while the K input is driven by the output of an AND gate 382. The output of the AND gate 382 is asserted if the SET_MISMATCH signal is deasserted while the CLR_MISMATCH signal is at a logic high level. In this manner, the flip-flop 376 generates the DLY_STAT during the next clock signal transition. The ADM_PW_STORED signal is provided by the output of a D-type flip flop 384, and is a delayed version of the output of an AND gate 386. The output of the AND gate 386 is asserted when the slot index bits IDX[2:0] reference slot 2 while the current state is the STORE_PASSWD state 256 and the next state is the IDLE state 252.

Referring now to FIG. 8, the EN_PASSWD_CNT signal is delayed by a D-type flip-flop 388 for one clock period to generate a DLY_EN_PASSWD_CNT signal, which provides additional time for the other circuits that depend on this signal. Two counters 390 and 398 are used to sequence the PASSWD_CNT signal and the DLY_CNT signal, respectively. Both counters 390 and 398 have the data inputs connected to logic high (the positive voltage supply rail), and the COUNT UP/DOWN input wired to ground to indicate that the counters 390 and 398 are to count down.

A load or LD input (active low) is used to reload the counter 390 with the values of the data inputs, and is driven by the output of a NOR gate 392. The NOR gate 392 asserts the LD input of the counter 390 when the SET_PASSWD_CNT signal is asserted or the RESET_signal is asserted. Clocking of the counter 390 is enabled via an AND gate 394 when the DLY_EN_PASSWD_CNT signal is asserted. The detection that the outputs of the counter 390 have reached zero is provided by an OR gate 396, the output of which drives the PASSWD_CNT signal.

Similarly, the LD input of the counter 398 is driven by the output of a NOR gate 400. The NOR gate 400 asserts the LD input of the counter 400 when either the RESET signal or the SET_DELAY_CNT signal is asserted. Clocking of the counter 400 is enabled via an AND gate 402 when the EN_DLY_CNT signal is asserted. The detection that the outputs of the counter 400 have reached zero is provided by an OR gate 404, the output of which drives the DLY_CNT signal.

Figure 9:
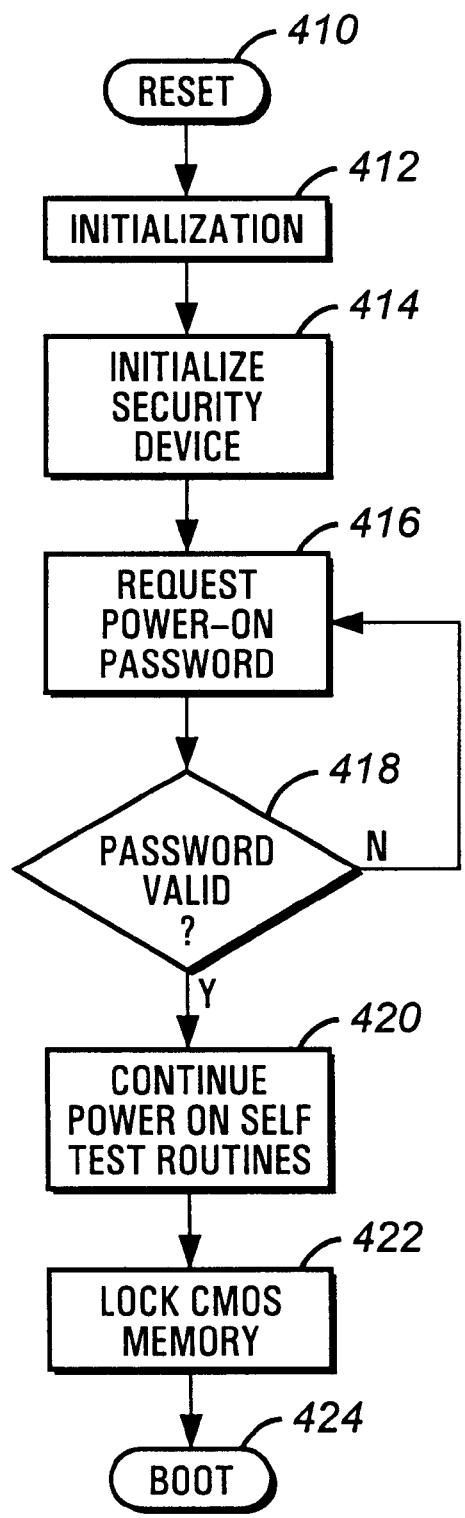
FIG. 9 is a flow chart of an exemplary boot-up process of the computer system of FIG. 1A.

Turning to FIG. 9, a simplified flow chart of an exemplary boot-up process of the computer system S of FIG. 1A is disclosed. As shown in FIG. 9, after the computer system S is reset in step 410, initialization is performed in step 412. After this initialization and the beginning of certain self test operations, the security device 100 is initialized in step 414. Next, at step 416, the computer system S requests a power-on password. If the password is valid as determined in step 418, control proceeds to step 420 for the continuation of the power-on-self-test routines. If the password is not valid, control returns to step 416.

In the disclosed embodiment of the invention, if an administrator password is entered instead of the power-on password, system will accept it as a valid power-on password and skip the any subsequent administrator password prompts. This requires slot 2 of the security device 100 to unlock slots 1 and slot 0 as if the power-on password was successfully entered. This also allows the administrator to gain access to the system without knowledge of the power-on password, thereby reducing the number of passwords required to be entered.

Following step 420, the CMOS memory 114 is locked in step 422 so that any contained passwords, such as the power-on and administrator passwords or any other sensitive information, are secured and cannot be read. This locking of the CMOS memory 114 is conventional, and the computer begins the boot-up process in step 424. Information regarding the locking of CMOS memory 114 can be obtained in data sheets and information relating to CMOS memory circuits adapted for personal computer use.

Figure 10:
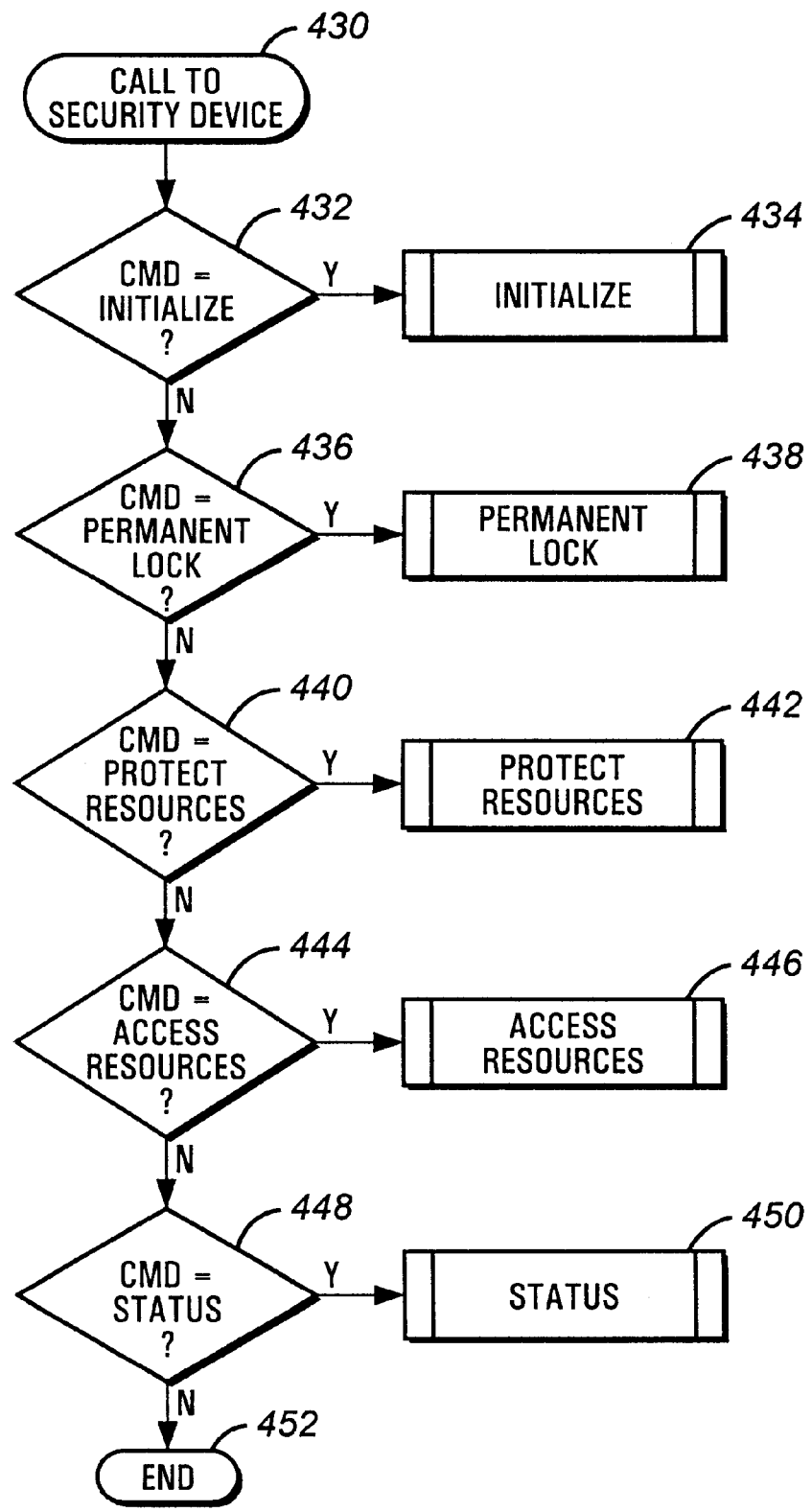
FIG. 10 is a flow chart of a BIOS software handler for a security management system in accordance with the invention.

FIG. 10 is a flow chart of an exemplary BIOS software handler for the security management system in accordance with the invention. It is noted that in this description the slot index bits IDX[2:0] are assumed index a single slot 102. The execution of the software begins when a system call is made to a security device handler in step 430. The command is then parsed in steps 432–452. In step 432, if the command is INITIALIZE, as provided in step 414, the Initialize routine is executed at step 434. Otherwise, as determined in step 436, if the command is PERMANENT LOCK, the Permanent Lock routine is executed at step 438. Otherwise, if the command is PROTECT RESOURCES as determined in step 440, the Protect Resources routine is executed at step 442. Otherwise, if the command is ACCESS RESOURCES as determined in step 446, the Access Resources routine is executed at step 446. Otherwise, if the command is READ STATUS as determined in step 448, the Status routine is executed at step 450. Otherwise, the software exits at step 452.

Figure 11:
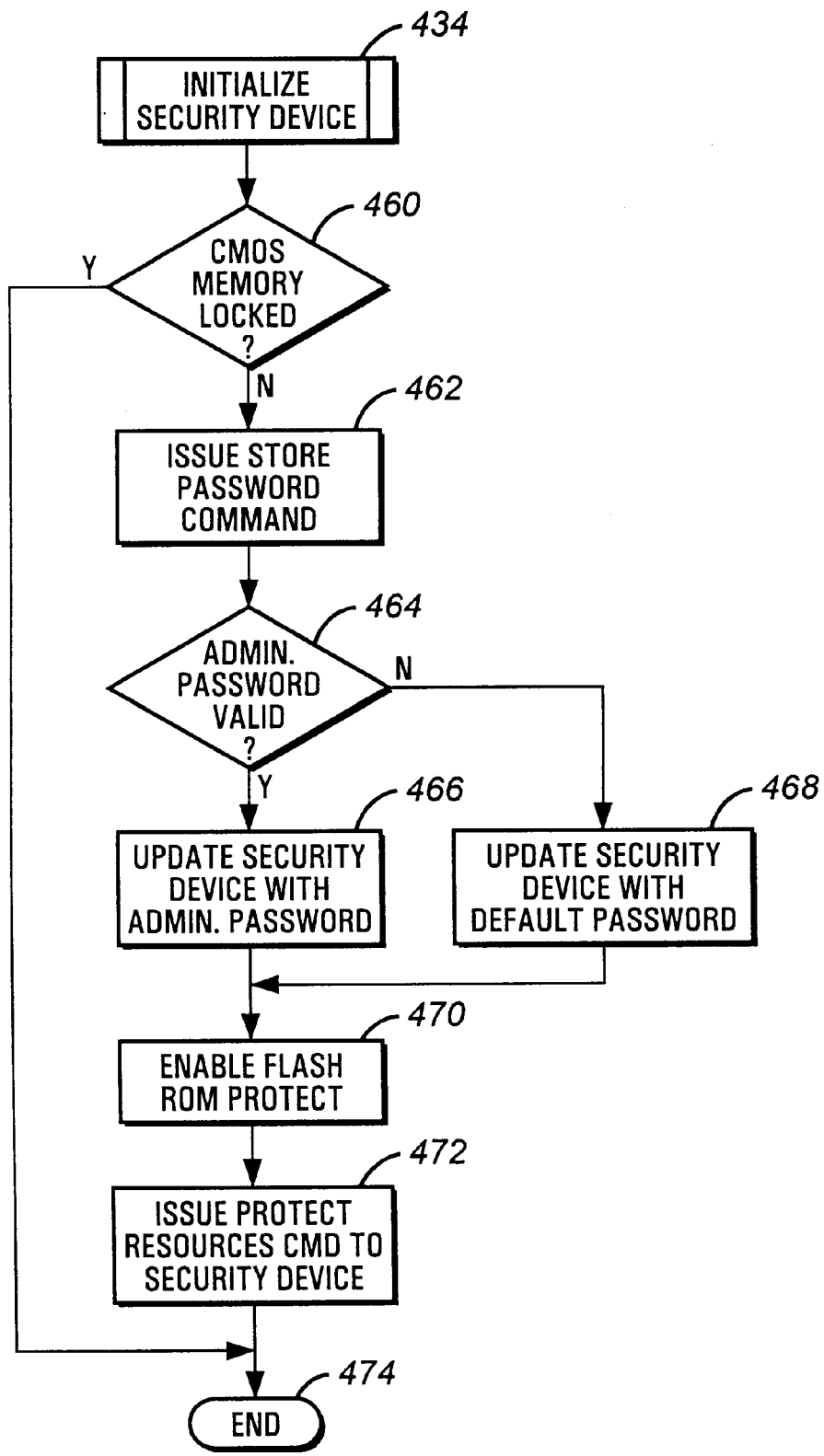
FIG. 11 is a flow chart illustrating BIOS initialization of a security management system in accordance with the present invention.

Turning to FIG. 11, a flow chart illustrating BIOS initialization 434 of a security management system in accordance with the present invention is disclosed. As noted in FIG. 9, the operation is entered during the power up procedures when the BIOS handler is called with an INITIALIZATION command value. In this initialization process, the computer system S first checks to determine if the CMOS memory 114 is locked at step 460. If so, the administrator password cannot be read, so the password cannot be obtained to be stored. Control is transferred to step 474 to exit the initialization procedure.

If the CMOS memory 114 is not locked, the computer system S issues a STORE PASSWORD command to the security device 100 in step 462. Control then proceeds to step 464 to determine if the administrator password is valid. If not, the security device 100 is updated with a default password at step 468, otherwise the security device 100 is updated with the administrator password at step 466. Next, the computer system S enables the Flash ROM protect bit at step 470 to prevent inadvertent programming to the Flash ROM 78. The PROTECT RESOURCES command is then issued to enable security protection in step 472. Control is transferred to step 474 to exit the initialization procedure.

Figure 12:
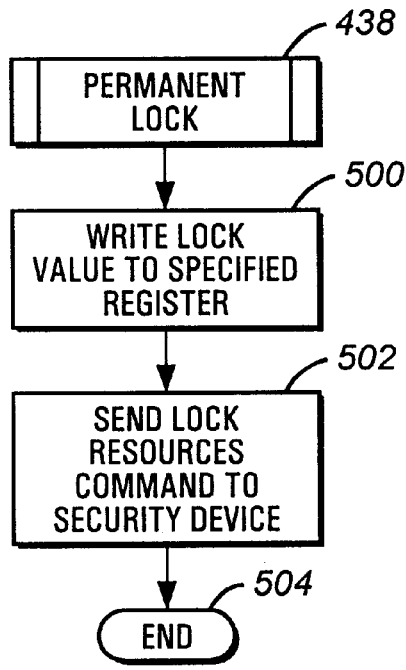
FIG. 12 is a flow chart of the BIOS software handler for the PERMANENT LOCK command of FIG. 10.

FIG. 12 is a flow chart of the BIOS software routine for the PERMANENT LOCK command, which begins at step 438. In step 500, the computer system S writes the Flash ROM lock value (or the lock value of any additional protected resources) to a specified write protect register. The computer system S then sends the PERMANENT LOCK command to the security device 100 in step 502 before exiting in step 504.

Figure 13:
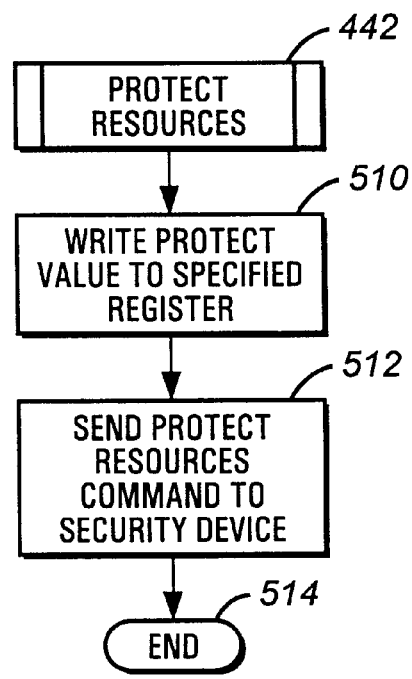
FIG. 13 is a flow chart of the BIOS software handler for the PROTECT RESOURCES command of FIG. 10.

Referring now to FIG. 13, a flow chart of the BIOS software routine 442 for the PROTECT RESOURCES command is illustrated. In step 510, the computer system S writes the Flash ROM protect value to a specified write protect register. The computer system S then sends the PROTECT RESOURCES command to the security device 100 in step 512 before exiting in step 514.

In the disclosed embodiment of the invention, issuing a PROTECT RESOURCES command from slot 2 does not function to lock slot 0 or slot 1. Because of this, prior to unlocking slot 2, the administrator should verify the status of slot 1 and slot 0 to determine if either is locked. The administrator should then return slot 0 and slot 1 to their previous state before issuing a PROTECT RESOURCES command to slot 2.

Figure 14:
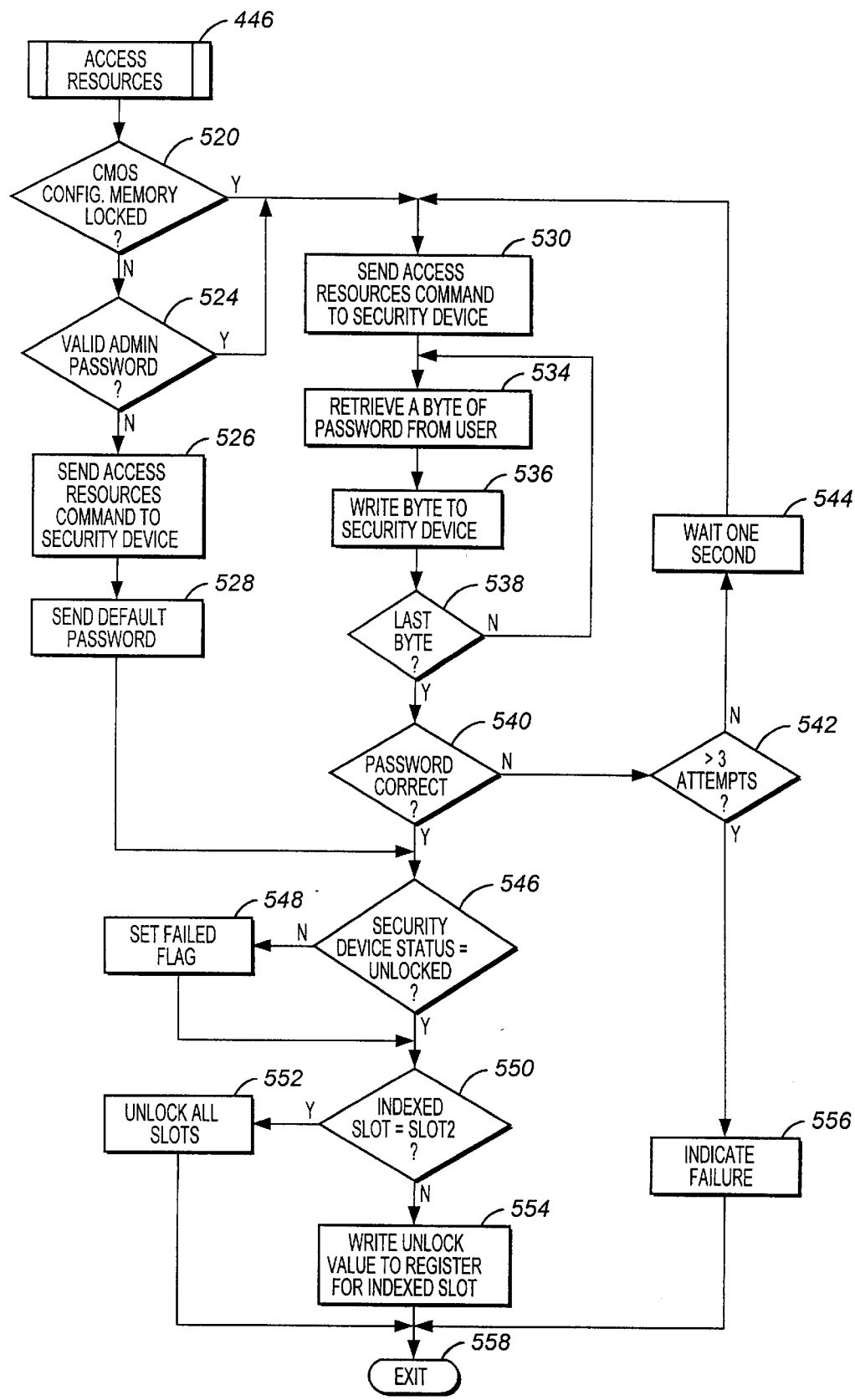
FIG. 14 is a flow chart of the BIOS software handler for the ACCESS RESOURCES command of FIG. 10.

FIG. 14 is a flow chart of the BIOS software routine 446 for the ACCESS RESOURCES command. The computer system S initially checks to determine if the CMOS memory 114 is locked in step 520. If not, the validity of the administrator password is tested in step 524. If the password is not valid, the computer system S uses a default password. In this process, control proceeds to step 526 and the computer system S then sends the ACCESS RESOURCES command to the security device 100. Control next proceeds to step 528 where a Default Password is sent to the security device 100.

In the event that the CMOS memory 114 is locked as determined in step 520, or if the CMOS memory 114 is not locked, but a valid administrator password exists as determined in step 524, the computer system S sends an ACCESS RESOURCES command to the security device 100 in step 530. A byte of password from the user is then retrieved in step 534, followed by a write of the password byte to the status/data register 104 of the security device 100 at step 536. Control then passes to step 538, where the computer system S determines if the last byte has been received. If not, control returns to step 534. Thus, the next eight writes to the status/data register 104 cause each byte written to the status/data register 104 to be compared against a byte of the password stored in the security device I 00. If the last byte is encountered in step 538, the software then verifies that the password was correct and accepted by examining the DELAY state bit from the security device 100 in step 540. If the password is rejected by the security device 100 as indicated by the DELAY state bit being set, the software checks to see if more than three passwords were attempted in step 540. If not, the software delays one second in step 544 by waiting for the DELAY state bit to clear before restarting the sequence by branching to step 530. If more than three passwords were attempted as determined in step 542, failure is indicated to the user in step 556 and the sequence is exited in step 558.

If the password was correct as determined in step 540, or if the default password was sent in step 528, the software branches to step 546, where the computer system S determines the locked status of the security device 100. If the security device 100 is still locked, a failure flag is set in step 548 to indicate failure in accessing the security device 100. If the security device 100 is unlocked as determined in step 546, or after setting the failure flag in step 548, the password or indexed slot 102 is examined in step 550 to determine if a valid administrator password has been entered in slot 2. If so, all slots 102 of the security device 100 are unlocked in step 552. If not, control passes to step 554 and an unlock value is provided for the write protect register of the indexed slot 102, before exiting in step 646.

Figure 15:
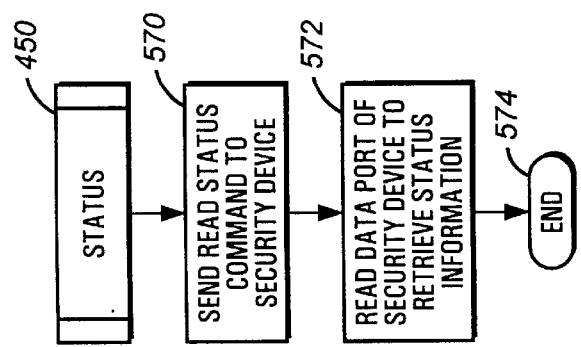
FIG. 15 is a flow chart of the BIOS software handler for the STATUS command of FIG. 10.

Referring now to FIG. 15, a flow chart of the BIOS software routine 450 for the READ STATUS command is disclosed. The software first sends the READ STATUS command to the security device 100 in step 570. Control then proceeds to step 572 where the status/data register 104 of the security device 100 is examined to retrieve the status of the indexed slot before exiting in step 558.

Figure 16:
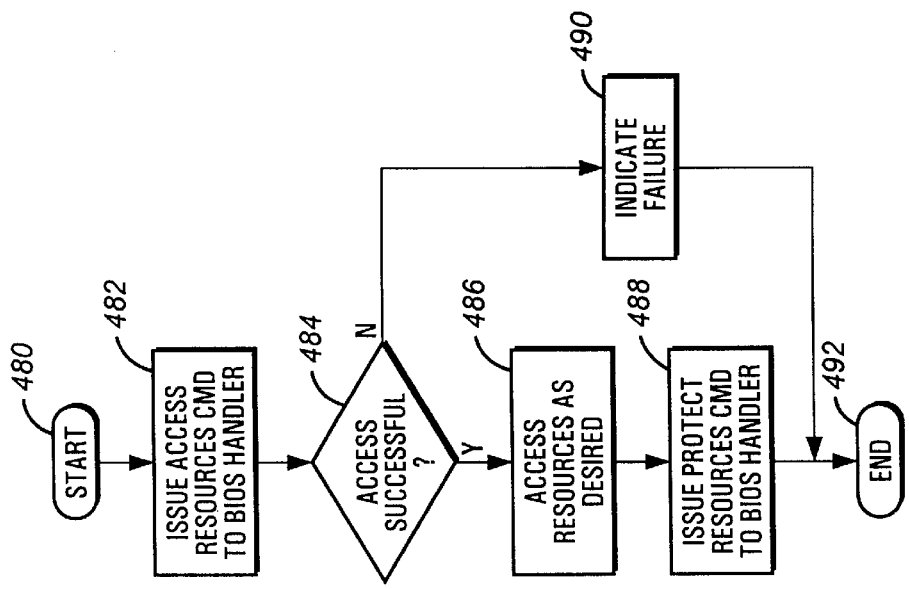
FIG. 16 is an illustrative flow chart of the general software process for issuing commands to the security management system in accordance with the present invention.

Referring to FIG. 16, an illustrative sequence for accessing secured resources is shown. This sequence would be followed, for example, by a program which controls downloading a new BIOS into the Flash ROM 78. After a password has been downloaded to the security device 100 at boot-up as described above, a PROTECT RESOURCES command can be issued to the security device 100. To gain access, the user provides the correct password to the security device 100, and the security device 100 allows access to the secured features. Security is enhanced in the preferred embodiment in that the password cannot be obtained from the security device 100—the password is initially written to it, following which the security device 100 can verify but not divulge a password. Additionally, the security device 100 controls the access. If code running on the processor could control the access, then an unauthorized user would only need to find out which bits to twiddle to unlock it. As the security device 100 cannot provide the password and the CMOS memory 114 is locked before the computer system S is booted so that the administrator password also cannot be read, the password is not available once the computer system S has left secure code.

As shown in FIG. 16, after entry in step 480, the software issues an ACCESS RESOURCES command to the BIOS handler at step 482. The BIOS handler then executes as described above. Control proceeds to step 484 to determine if a failure flag is set or a failure to provide the proper password occurred. If the access was not successful, control proceeds to step 490, where the failure is indicated to the user.

If the access was successful, the resource is unlocked and access to the secured resource(s) is permitted in step 486. In the case of a valid administrator password, all of the secured resources can be accessed. After the access is completed, successfully or unsuccessfully, a PROTECT RESOURCES command is issued to the security device 100 at step 488 before exiting at step 492.

Figure 17:
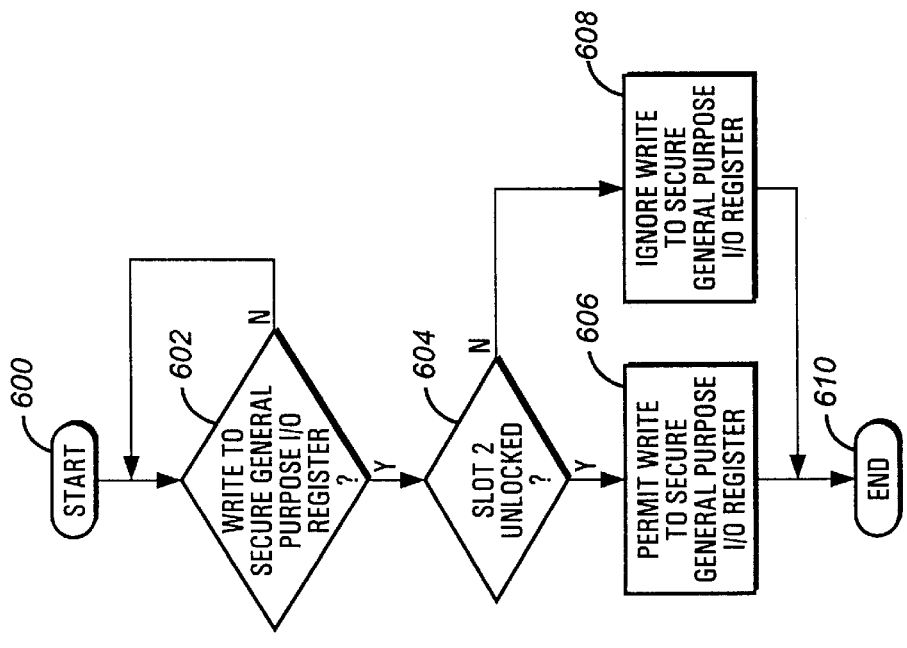
FIG. 17 is a flow chart of a general software process for writing to a secure general purpose I/O register according to the present invention.

Referring now to FIG. 17, a flow chart of a general software process for writing to a secure general purpose I/O register 111 according to the present invention is shown. The process may utilize circuitry such as that disclosed in FIG. 2B. Following commencement of a write process in step 600, the address decode logic of the ASIC 80 determines (step 602) if the write cycle is directed towards the secure general purpose I/O register 111. If not, the write cycle monitoring process loops at this point to await the next write cycle.

If the write cycle addresses the secure general purpose I/O register 111, control proceeds to step 604 and the security logic examines slot 2 of the security device 100 to determine if it has been unlocked by the administrator password. If not, the process proceeds to step 608 and the pending write cycle to the secure general purpose I/O register 111 is ignored. If slot 2 of the security device 100 is unlocked, the pending write cycle to the secure general purpose I/O register 111 is allowed to proceed in step 606. The software process ends in step 610 (or, alternatively, returns to step 600 ) following either of steps 606 or 608.

Thus, a security device and methodology that prevents unauthorized access to general purpose I/O pins in a computer system. In a system according to the invention, secure general purpose I/O pins are utilized as enable signals for data transfer devices such as Universal Serial Port (USB) ports. In one embodiment of the invention, access to the general purpose I/O pins is governed by an administrator password that is protected by a memory slot in a security device. When an administrator (or other authorized user) desires access to the general purpose I/O register that controls the secure general purpose I/O pins, the administrator enters the administrator password. If the password is correct, the relevant slot of the security device is unlocked, thereby permitting completion of write cycles to the general purpose I/O register. If a write cycle to the general purpose I/O register is attempted while the relevant slot in the security device is locked, the write cycle is ignored. Control and monitoring of various system resources in a secure manner is thereby permitted via use of the secure general purpose I/O pins.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A security device for providing secure a general purpose input/output pin in a computer system, comprising:
   a general purpose input/output pin for controlling or monitoring a specified portion of the computer system;
   control logic coupled to the general purpose input/output pin for controlling the status of the general purpose input/output pin;
   a first memory slot for securely storing a user password;
   an input register for receiving user key information; and
   comparator logic coupled to the first memory slot, the input register, and the control logic, the comparator logic asserting an unlock signal for enabling access to the control logic if the user key information matches the user password.

2. The security device of claim 1, wherein the control logic comprises a register having an output which determines the logic state of the general purpose input/output pin.

3. The security device of claim 2, further comprising:
   at least one additional general purpose input/output pin(s) for controlling or monitoring a specified portion(s) of the computer system; and
   additional control logic coupled to the at least one additional general purpose input/output pin(s) for controlling the status of the at least one additional general purpose input/output pin(s),
   the unlock signal further enabling access to the additional control logic if the user key information matches the user password.

4. The security device of claim 2, further comprising:
   at least one additional general purpose input/output pin(s) for controlling or monitoring a specified portion of the computer system;
   additional control logic coupled to the at least one additional general purpose input/output pin(s) for controlling the status of the at least one additional general purpose input/output pin(s); and
   at least one additional memory slot(s) for securely storing at least one additional user password(s),
   wherein the comparator logic is further coupled to the at least one additional memory slot(s), the comparator logic further configured to assert at least one additional unlock signal(s) for enabling access to the additional control logic if the user key information matches a corresponding one of the additional user password(s).

5. The security device of claim 4, wherein the additional control logic comprises at least one additional register(s) having an output which determines the logic state of the at least one additional general purpose input/output pin(s).

6. The security device of claim 1, further comprising:
   a second memory slot for securely storing an administrator password,
   the comparator logic further configured to assert the unlock signal if the user key information matches the administrator password.

7. The security device of claim 1, wherein assertion of the unlock signal permits write access to the control logic.

8. The security device of claim 1, wherein the general purpose input/output pin is configured to control access to a communication port of a computer system.

9. The security device of claim 1, wherein the communication port is essentially compliant with the Universal Serial Bus (USB) standard.

10. A computer system, comprising:
   a processor;
   a video subsystem coupled to the processor;
   a general purpose input/output pin for controlling or monitoring a specified portion of the computer system; and
   a security device coupled to the general purpose input/output pin, comprising:
      control logic coupled to the general purpose input/output pin for controlling the status of the general purpose input/output pin;
      a first memory slot for securely storing a user password;
      an input register for receiving user key information; and
      comparator logic coupled to the first memory slot, the input register,
   and the control logic, the comparator logic asserting an unlock signal for enabling access to the control logic if the user key information matches the user password.

11. The computer system of claim 10, further comprising:
   a network interface card for communicatively coupling the computer system to a network, the network interface card coupled to the security device, wherein the user password is an administrator password provided to the input register via the network interface card.

12. The computer system of claim 10, wherein the control logic comprises a register having an output which determines the logic state of the general purpose input/output pin.

13. The computer system of claim 12, wherein assertion of the unlock signal permits write access to the register.

14. The computer system of claim 10, wherein the specified portion of the computer system is a communication port.

15. The computer system of claim 14, wherein the communications port is essentially compliant with the Universal Serial Bus (USB) standard.

16. The computer system of claim 10, further comprising:
   at least one additional general purpose input/output pin(s) for controlling or monitoring a specified portion(s) of the computer system; and
   the security device further comprising:
      additional control logic coupled to and controlling the status of the at least one additional general purpose input/output pin(s),
      the unlock signal further enabling access to the additional control logic if the user key information matches the user password.

17. The computer system of claim 10, further comprising:
   at least one additional general purpose input/output pin(s) for controlling or monitoring a specified portion(s) of the computer system; and
   the security device further comprising:
      additional control logic coupled to and controlling the status of the at least one additional general purpose input/output pin(s); and
      at least one additional memory slot(s) for securely storing at least one additional user password(s),
      wherein the comparator logic is further coupled to the at least one additional memory slot(s), the comparator logic further configured to assert at least one additional unlock signal(s) for enabling access to the additional control logic if the user key information matches a corresponding one of the additional user password(s).

18. A method for accessing a secure general purpose input/output pin in a computer system, comprising the steps of:
   providing a security device having control logic coupled to and controlling the status of a general purpose input/output pin, the security device further comprising a first memory slot for securely storing a user password, an input register for receiving user key information, and comparator logic coupled to the first memory slot, the input register, and the control logic, the comparator logic configured to compare user key information to the user password;
   providing user key information to the register of the security device;
   comparing the user key information to the user password; and
   permitting access to the control logic if the user key information matches the user password.

19. The method of claim 18, wherein the step of permitting access comprises assertion of an unlock signal that enables write access to the control logic.

20. The method of claim 19, wherein the control logic comprises a register having an output which determines the logic state of the general purpose input/output pin.

* * * * *